United States Patent [19]
Onufryk

[11] Patent Number: 5,155,508
[45] Date of Patent: Oct. 13, 1992

[54] OPHTHALMIC PRISMATIC IMAGE RELOCATING EYE GLASSES FOR PERSONS HAVING RETINITIS PIGMENTOSA AND HEMIANOPIA AND METHOD FOR MAKING SAME

[76] Inventor: Michael Onufryk, 9 Wickford Way, Fairport, N.Y. 14450

[21] Appl. No.: 410,119

[22] Filed: Sep. 20, 1989

Related U.S. Application Data

[60] Continuation-in-part of Ser. No. 281,961, Dec. 5, 1988, abandoned, which is a continuation of Ser. No. 44,837, Apr. 30, 1987, abandoned, which is a division of Ser. No. 435,767, Oct. 21, 1982, abandoned.

[51] Int. Cl.⁵ .......................... G02C 7/06; G02C 1/00
[52] U.S. Cl. ..................................... 351/158; 351/170
[58] Field of Search .............. 351/50, 158, 175, 227, 351/41, 177, 170, 246; 350/420, 447; 359/668, 737

[56] References Cited

U.S. PATENT DOCUMENTS

| Re. 28,921 | 8/1976 | Haines . | |
|---|---|---|---|
| 1,990,107 | 2/1935 | Armbruster . | |
| 2,264,152 | 4/1981 | Crane . | |
| 2,442,849 | 6/1948 | Glazer . | |
| 3,423,151 | 1/1969 | White . | |
| 4,288,149 | 9/1981 | Campbell | 351/170 |
| 4,298,253 | 11/1981 | Tagnon . | |
| 4,381,143 | 4/1983 | Bommanito | 351/230 |
| 4,772,113 | 9/1988 | Parker . | |
| 4,779,972 | 10/1988 | Gottlieb | 351/175 X |

OTHER PUBLICATIONS

Neiss, The Optician "Cemented Prism for Severe Field Loss".

Primary Examiner—Rodney B. Bovernick
Attorney, Agent, or Firm—Cumpston & Shaw

[57] ABSTRACT

A pair of rotatable optical image deflector assemblies is disclosed which are detachably mounted via an adapter bracket to a conventional eye testing apparatus. Each optical image deflector assembly has a fixed light reflecting optical element, and a pivotal reflecting optical element. The optical image deflector assembly directs light onto a peripheral area of a visually sensitive or functional area of the retina which is normal to the central field of the retina. The pivotal optical element scans a pre-set field expanding test chart and projects an image thereof to the visually sensitive or functional area of the retina. The optical image deflector assembly is usable in making prismatic eye glasses to expand the normal central field of view of a person suffering from retinitis pigmentosa or hemianopia. The prismatic eye glasses refract images from a field outside the normal central field of view within and long the peripheral edge of the visually sensitive central area of the retina for expanding the normal central field of view.

16 Claims, 18 Drawing Sheets

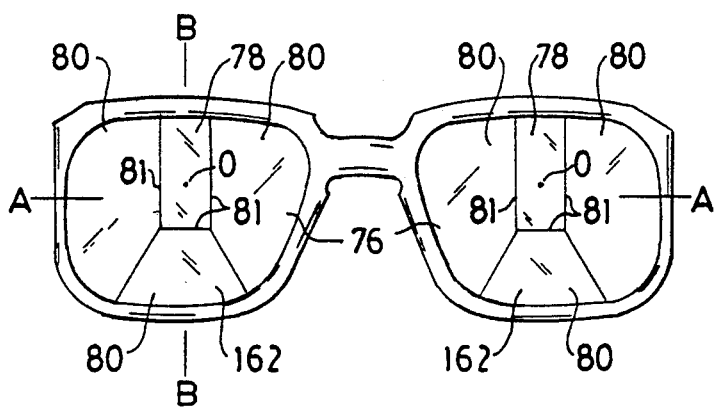
FIG. 10
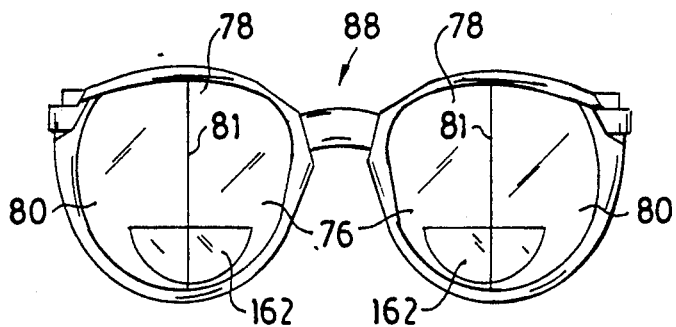
FIG 12
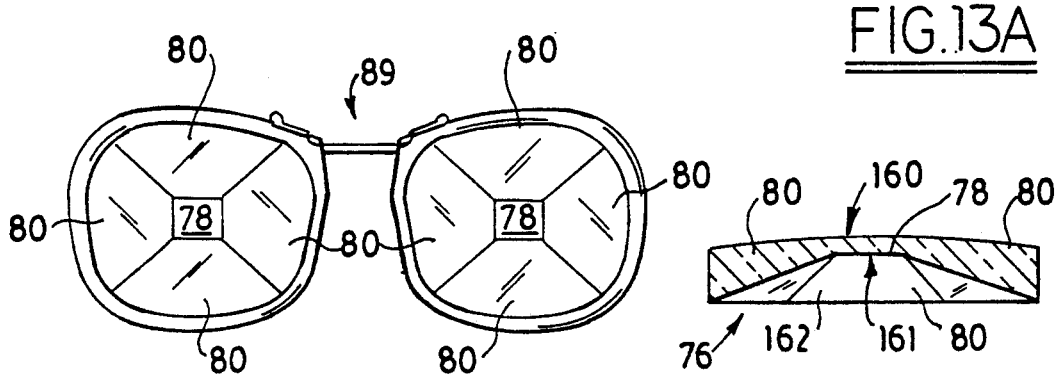
FIG. 14
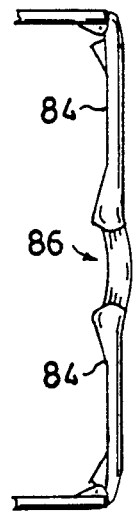
FIG. 13
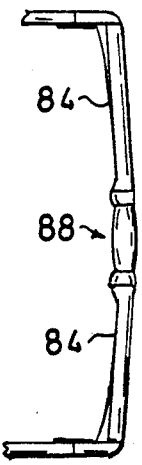
FIG. 13A
FIG. 11

THE OPIR FIELD EXPANDING SPECTACLES

For: _____ Address _____

City / State / Zip: _____ Phone: _____

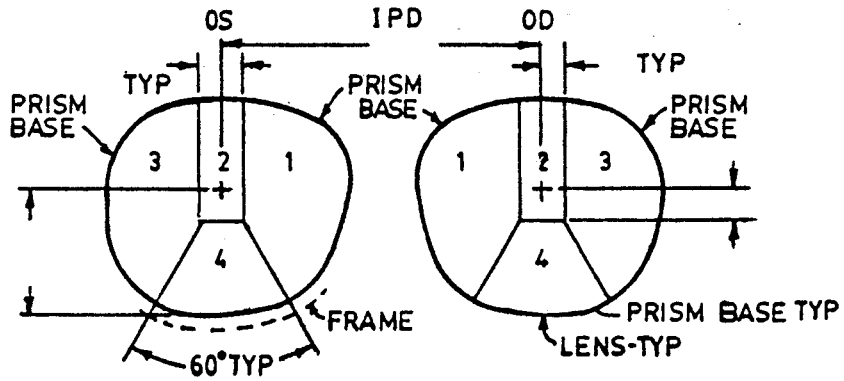

Notes:
1 - Distance Rx Plus Prism
2 - Distance Rx No Prism
3 - Distance Rx Plus Prism
4 - Distance Rx Plus Bifocal Add and Prism
5 - All Joints Must Be Hairline or Better
6 - All Sharp Corners and Edges Must Be Broken With a Radius
7 - Tolerance: Lens Dimensions, +.50mm
   Rx, Stanadard FDA Approved
   Prisms, + one Diopter, Prisms Must Be Matched

PRESCRIPTION

| Eye | Sphere | Cylinder | Axis | Prism △ |
|-----|--------|----------|------|---------|
| OD  |        |          |      |         |
| OS  |        |          |      |         |
| ADD | OD     |          |      |         |
|     | OS     |          |      |         |

Dr. _____ Date _____

FIG. 20

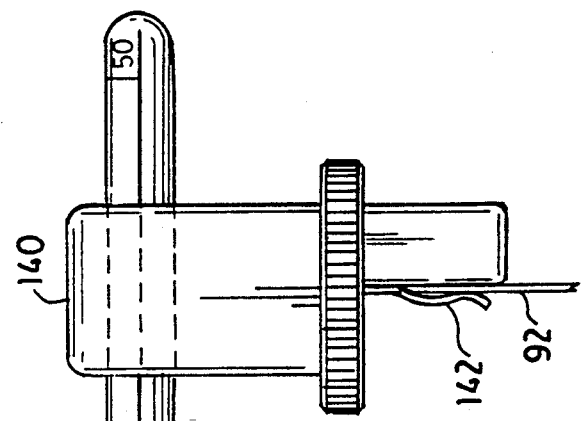
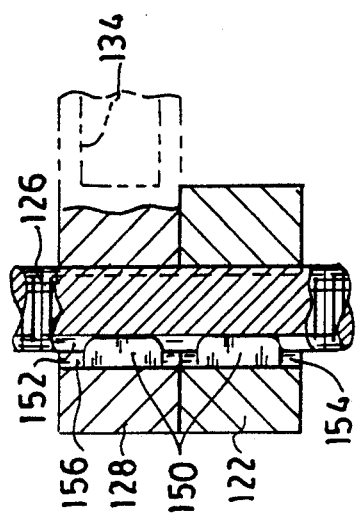
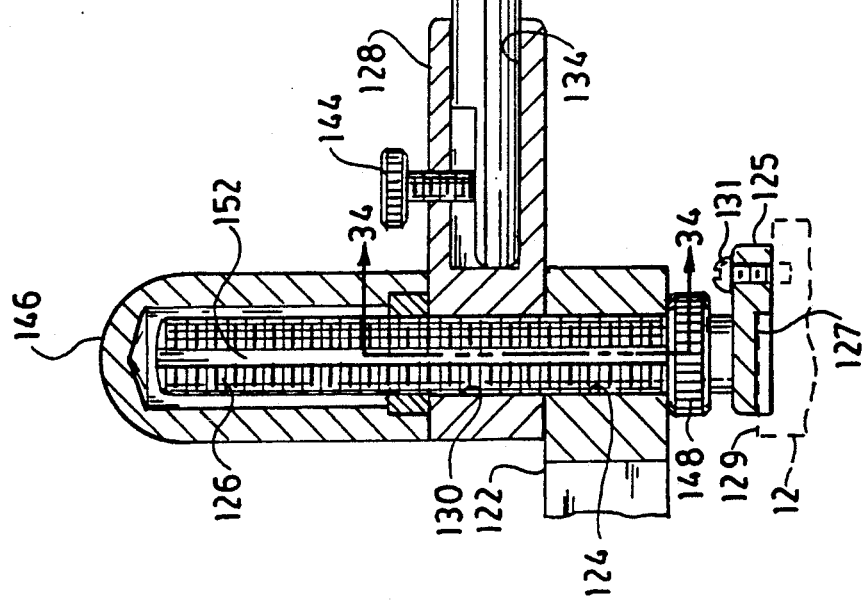

OPHTHALMIC PRISMATIC IMAGE RELOCATING EYE GLASSES FOR PERSONS HAVING RETINITIS PIGMENTOSA AND HEMIANOPIA AND METHOD FOR MAKING SAME

This is a continuation-in-part of copending application(s) Ser. No. 07/281,961 filed on Dec. 5, 1988 now abandoned, which is a continuation of Ser. No. 07/044,837 filed on 4/30/87 now abandoned, which is a divisional of 06/435,767 filed on 12/21/82 now abandoned.

BACKGROUND OF THE INVENTION

1. Field of the Invention

The present invention relates to visual examining and sight corrective apparatus, and more particularly to an optical image deflector assembly and method for its use in scanning eyes, locating visually sensitive peripheral areas thereof, and determining corrective prismatic eye glasses adapted to focus light within and along the peripheral edge of the visually sensitive central areas of the eyes for expanding the normal central field of view. More specifically, the invention is directed to prismatic eye glasses and method of making same for persons having retinitis pigmentosa and hemianopia.

2. Description of the Prior Art

U.S. Pat. No. Re. 28,921 discloses an automatic visual sensitivity and blind spot measuring apparatus comprising a device for projecting a spot at different locations on a screen to be viewed by the person being tested along with means for the person to indicate perception of the spot for subsequent evaluation. The device further comprises means for projecting the spot in different positions in the field of vision of the person being tested.

U.S. Pat. No. 1,990,107 relates to a reflectoscope used in the examination of an eye. The reflectoscope comprises mirrors for reflecting an eye focused image around an operator so that the eye can be observed in the correct orientation to prescribe lenses for correcting refractive disfunctions. The image is reflected onto the normally sensitive portion of the eye.

U.S. Pat. No. 4,264,152 relates to apparatus for moving an image of a target in certain preselected ways to stimulate certain types of eye movements in the subject.

U.S. Pat. No. 4,298,253 relates to apparatus for presenting test images to a viewer at different distances without modifying the visual angle or acuity of the images.

U.S. Pat. No. 3,423,151 relates to auxiliary prismatic lenses mountable on an eye glass frame for use by persons having cataracts. The lenses extend the field of view of the person beyond that provided by ordinary lenses by focusing images beyond the range of the normal lenses onto the pupil of the eye.

U.S. Pat. No. 2,442,849 relates to a method for producing a pair of lenses for providing balanced binocular vision to a greater degree than was previously possible. The invention particularly relates to the correction of conventional disorders such as refractive disorders.

U.S. Pat. No. 4,772,113 relates to eye glasses for improving the vision of people with macular degeneration, optic nerve damage or similar low vision problems, in which their central vision has deteriorated. The eye glasses comprise two lens assemblies, each having a magnifying lens with two convex surfaces and a reducing lens with two concave surfaces. The reducing lens incorporates a prism ring which shifts and focuses a highly intensified light image onto an undamaged peripheral portion of the retina. A disadvantage of these eye glasses is that they are of no value, for people suffering from retinitis pigmentosa or hemianopia, in which their central vision is good and the peripheral vision is bad, since the shifted image would be focused on a damaged peripheral portion of the retina. Another disadvantage is that the lens do not have a central clear or non-prism area for accommodating the person's good central vision. Also, in those instances where the shifted image would strike the central functional area of the retina, overlapping would occur, resulting in diplopia (double vision).

In addition to the prior art patent literature, an eye disease is known called neovascular senile macular degeneration N.S.M.D.) in which central vision is greatly impaired, often resulting in blindness by virtue of blood vessels growing into the macula of the eye. The macula controls central vision in the retina, and the rest of the retina is used for peripheral vision. The problem of central vision impairment and blindness due to N.S.M.D. and other problems such as retinitis pigmentosa (tunnel vision) and hemianopia are substantially overcome by the optical image deflector assembly and eye glasses of this invention.

A known eye glass modification intended to expand a person's central field of view for people having retinitis pigmentosa and hemianopia involves the amorphic telescopic lens system, in which one or more telescopes are mounted on each eye glass. The telescopes minify the images so that more information can be seen at one time in the same field. Disadvantages of this form of expanding the field is that multiple images are seen by each eye, and the images are almost twice as small, so that detail is lost. Also, the telescopes extend outwardly a distance from the eye glasses where the force created by the moment of inertia is constantly slipping the spectacles from the nose resting position and falling so that they can be easily damaged. The eye glasses further are not cosmetically appealing, and they are two or more times heavier than normal eye glasses, making them uncomfortable to wear and prone to slip off the wearer's ears due to the force moments generated by the outwardly extending telescopes.

Also known in the prior field expanding art is the use of prisms which are cemented to the temporal edge of the eye glass lenses (base out). The prisms increase a person's efficiency of information processing with reduced fields and normally are not a means for expanding the field. The prisms allow the eye glass wearer to scan the periphery by making small eye movements into the prism to check for objects in the periphery, thereby eliminating the need for inefficient neck movements to accomplish the same task. An exemplary reference of such prism use is disclosed by Dr. Weiss in S, *The Optician.* Cemented Prism for Severe Field Loss, Volume 163, Jul. 7, 1962. The primary disadvantages of difficulties associated with the use of such prisms are prism blur which may be difficult to tolerate, confusion between frontal and peripheral images, particularly in crowds where people are moving in all directions, diplopia caused by the wearer looking through the edge of the prism, or not suppressing the other eye when one eye is looking through the prism, the necessity for small eye movements into the prism to check for objects in the periphery, resulting in loss of frontal image and a blind spot between the frontal and prism images, prismatic distortions, such as horizontal magnification, curvature of vertical lines, asymmetric horizontal magnification, vertical magnification and change in vertical magnification, with horizontal viewing angle. The prism, when cemented onto the inner surface of the eye glass lens, extends outwardly from the lens and can be hazardous to the eye. The mounting of the prism can be complicated and delicate, due to the lens curvature, and the resulting eye glasses are cosmetically unappealing.

A specialized form of prism known in the art is the fresnel prism. This prism is used for special applications, such as for diagnostic tests. Fresnal prisms are thin sheets of optical plastic composed of multiple prismlets that are pressed into this thin plastic sheet. They are adhered to normal prescription spectacles by capillary action and are subjected to air bubbling during temperature and humidity changes. Fresnel prisms are used in diagnostic and temporary correction and/or preliminary concept of prism requirements for such eye problems as retinitis pigmentosa, strabismus, hemianopia, and macular degeneration, unlike the prescription corrected field expanding glasses herein disclosed, which are clear and transmit or project clear full size images to the retina. The fresnel prisms have poor light transmission and the transmitted or projected images are blurred due to the many prismlets that are pressed into the soft plastic.

The fresnal prisms have a number of other disadvantages. Projection to the retina, especially in crowds as people move in all directions causes multiple images. Double vision results when the right eye looks to the right and the left eye looks through the nasal edge of the left spectacle lens. The multiple prismlets reduce light transmission, which reduces vision and causes night blindness and mobility problems. The multiple prismlets cause many reflections of the same object, especially light bulbs etc., and cause chromatic dispersion. Due to the multiple prismlets, contrast is greatly reduced, and patients are constantly looking through a fine grid. With fresnel prisms the patient must rotate his eye to look into the prism to see the expanded field.

In addition, the fresnel prisms suffer from most of the problems indicated above for prisms generally. In addition, the fresnel prisms suffer from air bubbles when mounted on a surface, are prone to fall off the surface, and subject the viewer to multiple images reflected by the prism rings.

Another known vision-expanding lens in the prior art involves the use of a see-through reflector or mirror, functioning as a beam splitter, mounted on the eye glass frame to extend from the nose at a 45 degree angle to the eye. Disadvantages of this type of vision-expanding lens are that the eye glass user sees two separate images, front and rear, which can be confusing, the mounting of the reflector to the eye glass frame can be complicated and difficult, the reflector extends outwardly from the eye glass lens in an exposed position where it can be readily damaged, and the eye glasses are cosmetically unappealing.

Still another attempt in the prior art to expand the field of view of persons with poor vision involves special high-powered magnifying glasses capable of magnifying an object up to six times, while allowing vision from the side. Disadvantages of this approach are that the eye glasses resemble goggles and protrude nearly three inches from the nose. They must be worn with soft contact lenses, are heavy and cumbersome, and are cosmetically unappealing.

It is clear from the prior art that a strong need exists for eye glasses for expanding the field of view of persons suffering from retinitis pigmentosa and hemianopia without the person suffering the problems and disadvantages of the prior known efforts to expand a person's field of view. This is achieved with the inexpensive, light weight and cosmetically appealing eye glasses of this invention, by refracting images from a field outside the person's normal field of view within and along the peripheral edge of the visually sensitive central functional area of the retina for expanding the central field of view without generating diplopia, distortion and/or blind spots.

SUMMARY OF THE INVENTION

An object of the present invention is to provide an opthalmic, single element, light weight, prismatic image relocating prismatic eye glasses and a method of manufacturing same for a person having at least one eye having a central visually sensitive functional area of the retina for receiving the normal central visual field of view, and having at least a partial insensitive peripheral area of the retina. The prismatic eye glasses comprise:

a single lens member having a non-prism portion for accommodating the central visual field of view; and a prism on the lens member having the apex thereof contiguous with the non-prism portion and the base thereof extending radially outwardly, the diopter power of the prism adapted to refract an image within and along the peripheral edge of the central visually sensitive functional area of the retina, for expanding the normal central visual field of view of the eye without generating diplopia, distortion and/or a blind spot between the normal central visual field of view and the expanded visual field of view.

In accordance with a preferred embodiment of the invention, a pair of rotatable optical image deflecting assemblies and method are disclosed in which the assemblies are preferably detachably mounted via an adapter onto a standard eye testing apparatus. The mechanical center of each optical assembly is aligned with the optical center of an eye. The optical assemblies are useful in locating the most visually sensitive peripheral portions of the retina, and determining the prism diopters required for corrective prismatic eye glasses for focusing images thereon.

Each optical image deflecting assembly has a fixed light reflecting optical element such as a mirror and a pivotal reflecting optical element such as a mirror. Light received from one of the mirrors is reflected onto a peripheral area of an eye for scanning an arcuate portion of the peripheral area upon pivotal movement of the pivotal mirror. Means are provided for selectively incrementally rotating each optical assembly through a complete revolution. The pivotal optical element is pivoted at each incremental position for scanning an annular peripheral area of each eye and locating the most visually sensitive areas therein. After determining the prism diopters required and testing with trial lens(es), a prismatic lens(es) is then determined for each examined eye and mounted in an eye glass frame to provide the best possible acuity for the eyes.

In a more specific aspect of the invention, each optical assembly comprises a first ring secured to the frame, and a second ring rotatably mounted on the first ring. The fixed and pivoting optical elements are mounted on diametrically opposed portions of the second ring.

The invention and its advantages will become more apparent from the detailed description of the invention presented below.

BRIEF DESCRIPTION OF THE DRAWINGS

In the detailed description of the invention presented below, reference is made to the accompanying drawings, in which:

FIG. 10 is a front elevational view of prismatic eye glasses made with lens elements of the type disclosed for retinitis pigmentosa in FIG. 9;

FIG. 11 is a section view of a lens element of FIG. 10 taken substantially along line A—A with the eye glasses frame omitted;

FIG. 12 is a front elevational view of prismatic eye glasses designed to expand a normal field of view for a person having hemianopia;

FIG. 13 and 13a are reduced substantially top plan views of the eye glasses of FIGS. 10 and 12 showing that the thicknesses thereof are comparable to conventional eye glasses;

FIG. 14 is a front elevational view of prismatic clip-on eye glasses which are clipped onto the frame of conventional prescription corrected eye glasses;

FIG. 20 is a top plan view of a prescription form for making prismatic field expanding eye glasses;

FIG. 33 is an enlarged view, partly in section, of the support bracket assembly of the mounting device of FIG. 32 for supporting the eye examining apparatus and eye charts; and FIG. 34 is a segmental section view taken substantially along line 34—34 of FIG. 33.

DETAILED DESCRIPTION OF THE INVENTION

Figure 1:
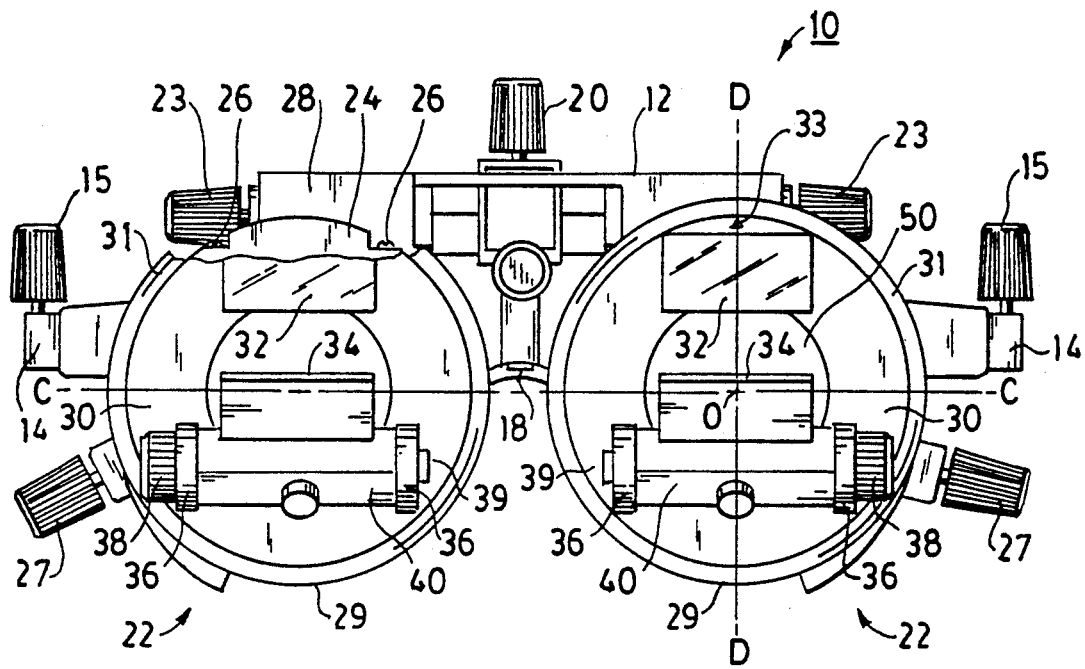
FIG. 1 is a front elevation view of a preferred embodiment of an eye examining apparatus of this invention with a portion thereof broken away to show a portion of the mounting bracket.
Figure 2:
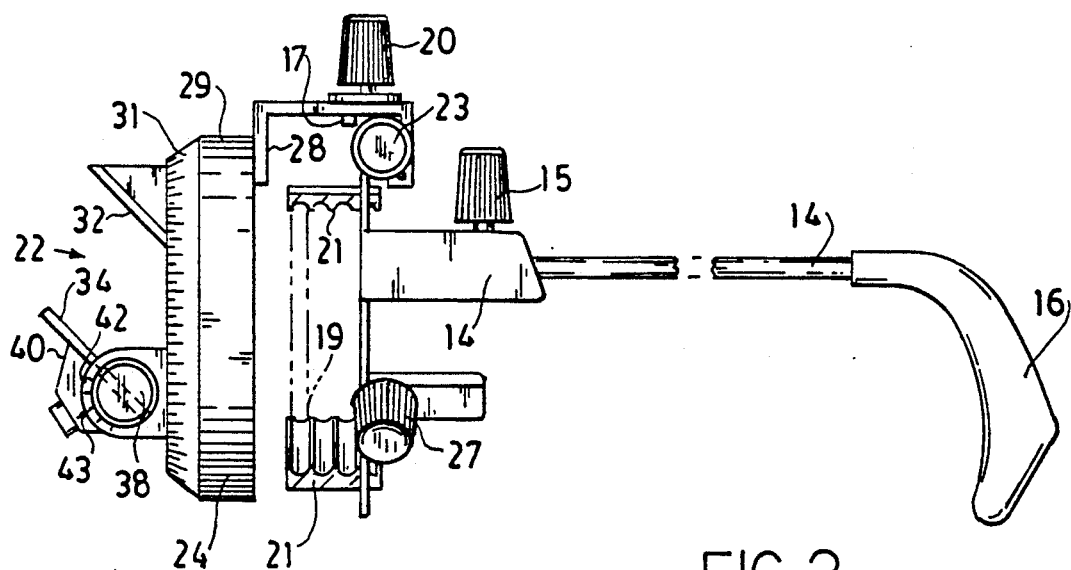
FIG. 2 is a side elevational view of the eye examining apparatus of FIG. 1.
Figure 3:
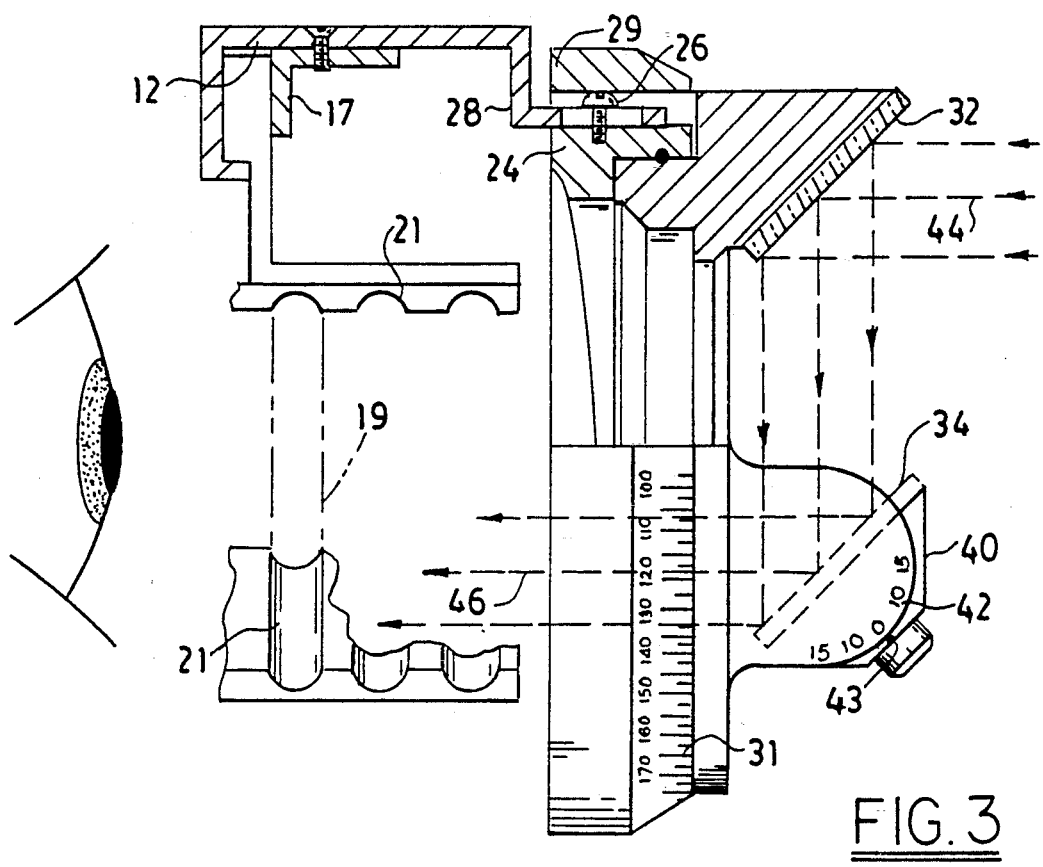
FIG. 3 is an enlarged side elevational view, partially in section, of an optical image deflecting assembly mountable by a bracket to a standard trial lens holder.

With reference to FIGS. 1-3, an eye examining apparatus 10 is disclosed comprising an adapter bracket 12 having temple bars 14 each hingedly connected at one of the ends thereof to end portions of the bracket. The opposite ends of temple bars 14 have suitable ear pieces 16 for mounting the bracket 12 onto the head of a person whose eyes are to be examined. The temple bars 14 may have conventional adjusting means, not shown, by which the length of the bars may be changed to adjust the position of the bracket relative to the person's eyes. A nose piece 18 is mounted on bracket 12 and has conventional adjusting means 20 for raising or lowering bracket 12 relative to the person's eyes. A conventional trial lens holding means 21 is affixed to bracket 12 by an L-shaped retainer 17 (FIG. 3) and extends downwardly from frame 12 for holding trial lens(es) 19. The trial lens holding means 21 is laterally, tiltably and rotatably adjustable by any suitable adjusting means 23, 25, and 27 respectively.

A pair of identical optical image deflector assemblies 22 is detachably mounted on bracket 12 in laterally spaced relation. Each optical image deflector assembly 22 comprises a first annular ring 24 secured by screws 26 to slotted, spaced lugs 28 extending from bracket 12, as best seen in FIGS. 1 and 3. Alternatively each optical assembly 22 can be releasably connected to bracket 12 by any suitable quick-disconnect means, not shown. The first ring 24 has a cylindrical inner surface for rotatably receiving an outer cylindrical surface of a second annular ring 30. An "0" ring is positioned in facing grooves in the inner and outer surfaces for releasably securing the first and second rings 24, 30 together for relative rotatable movement therebetween by manual means, or any suitable pinion and ring gear, not shown. An annular scale member 29 is secured to ring 24, and is provided with indicia 31 that cooperated with an index 33 on ring 30 to indicate the angular position of ring 30 during rotation thereof.

An optical element extends laterally from one side of ring 30 and has a surface inclined 45° to the axis of ring 30 for supporting a fixed reflecting mirror 32 affixed thereto. An optical element comprising a reflecting mirror 34 is pivotally mounted on ring 30 in a position diametrically opposed from fixed mirror 32. A pair of spaced, laterally extending side walls 36 have screws 38, 39 extending through openings in the walls into threaded bores at one end of support member 40. Pivoting mirror 34 is secured to support member 40, and screws 38, 39 form a pivot for the support member and mirror. Support member 40 has an index 43 which cooperates with a scale 42 on a wall 36 for indicating the pivotal position of the pivoting mirror 34 relative to a zero degree position in which the pivoting mirror is parallel to fixed mirror 32. By tightening one or both of the screws 38, 39, the pivoting mirror 34 can be locked in any pivotally selected position.

Figure 4:
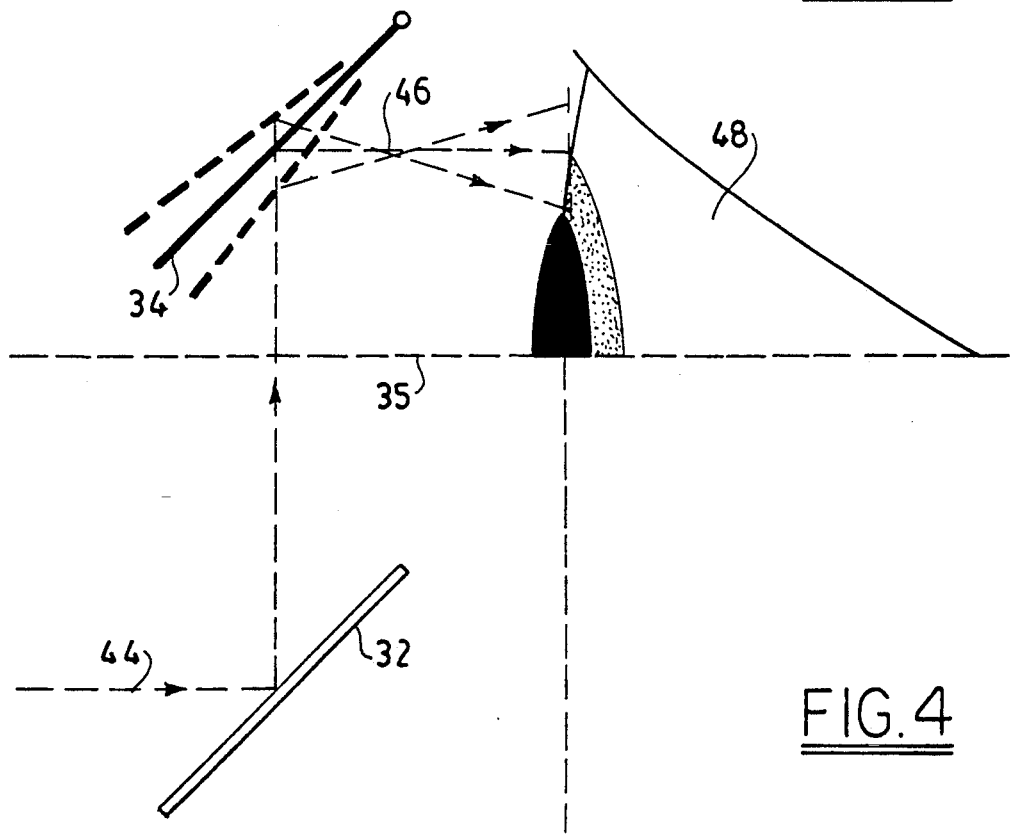
FIG. 4 is a schematic view of the optical system of the eye examining apparatus of the invention.

With reference to FIG. 4, a schematic view of an optical assembly 22 for locating the most sensitive peripheral area of an eye 48 is rotatable about its axis 35, which is coincident with the optical axis 0 of the eye. A normal incident light ray 44 strikes fixed reflecting mirror 32, and is reflected onto a parallel pivotal reflecting mirror 34, which reflects a normal light ray 46 onto a peripheral area of eye 48. By pivoting reflecting mirror 34, the reflected light ray scans an arcuate peripheral area of the eye, and the total angle through which the mirror is pivoted in scanning the sensitive area is referred to as the wedge angle A.

Figure 5:
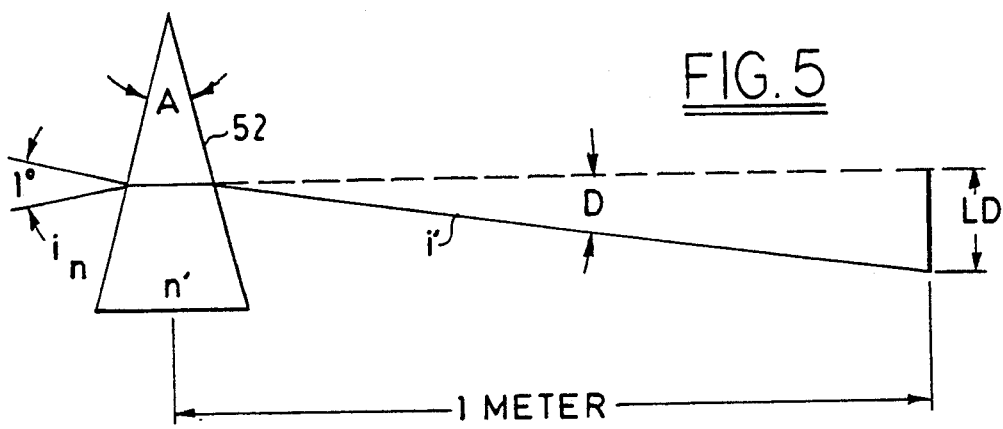
FIG. 5 is a schematic view of a prism for deviating light rays, in which all of the angles have been exaggerated for use in explaining conversion of a wedge angle to prism diopters.

To convert this wedge angle A to prism diopters or units of refractive power needed to laterally deviate light ray 46 from incident light ray 44, reference is made to FIG. 5. Prism diopters is defined as a linear deviation in centimeters which the prism produces at a distance of one meter when a ray passes through the prism at minimum deviation. For this conversion, a prism 52 of clear plastic having an index of refraction n of 1.5 is used as compared to an index of refraction n for air of 1. Some assumptions are made such as the selection of a wedge angle A of 2°, for example, and disregarding the sines of small wedge angles when using Snell's law $n \sin \theta = n' \sin \theta'$ in which n, n' represent the indexes of refraction of the mediums and $\theta$, $\theta'$ the angles of incidence and refraction, respectively. Incident and refracted light rays designed i, i' respectively of 1° are used, although shown exaggerated in FIG. 5 for purposes of clarity.

Accordingly, the deviation angle D in FIG. 5 is derived as follows:

$$D = (n' - n)A$$

$$D = (1.5 - 1)2$$

$$D = 0.5 \times 2$$

$$D = 1°$$

Then the linear deviation (LD) is computed as follows:

$$LD = (\tan 1°)(1 \text{ meter})$$

$$LD = .0175 \times 100 \text{ centimeters (CM)}$$

$$LD = 1.75 \text{ cm}$$

Therefore, a factor for linear devision in centimeters per degree of angle incidence is computed as follows:

$$\text{Factor} = \frac{1.75}{1} = 1.75$$

Now let us assume that in the aforementioned example illustrated with reference to FIG. 4, the wedge angle A for best peripheral vision was determined to be 9°. The incident angle which is one-half the wedge angle is read directly from scale 42 as 4.5°. Accordingly, to convert the wedge angle A to prism diopters, the distance the light must be deviated or refracted from the optical center of the eye for best peripheral vision is equal to the incident angle of 4.5° times the factor of 1.75, or 7.87 cm. Since a prism of one diopter bends light such that a refracted ray deviates one cm from the projected incident ray at a distance of one meter from the prism, the number of prism diopters needed is $$\frac{7.87}{1} \text{ or } 7.87.$$

In actual use, a prism 52 of eight prism diopters would be selected.

In the operation of the eye examining apparatus of this invention for determining a wedge angle A and prism diopters for best peripheral vision, the pivoting mirrors 34 and optical assemblies 22 are initially placed in their zero degree positions. In this position, the mirrors 32, 34 are aligned with vertical lines passing through the centers of the assemblies 22. An opaque lens 50 is placed in the lens holding means 21 for the eye that is not being tested. No lens of any type is placed in the trial lens holding means 21 for the eye to be tested at this time.

The eye examining apparatus 10 is placed on a person whose eyes 48 are to be tested, and the temple bars 14, nose piece 18 and lens holding means 21 are adjusted so that the mechanical centers of the mirror assemblies 22 are aligned with the optical centers of the eyes.

The mirror assembly 22 for the eye being tested is incrementally rotated through a complete revolution, stopping, for example, at each 10° (degree) position. It may be preferable to rotate the mirror assembly 180° in one direction, return to the zero position, and then rotate 180° in the opposite direction. At each position, pivoting mirror 34 is pivoted plus or minus 15° to scan the arcuate peripheral area of the eye. At each position, the comments of the person being tested with regard to visual perception of bright areas or objects are noted. If visual perception is noted, the wedge angle that was required to produce this perception is recorded along with the incident angle read directly from scale 42. The rotating procedure is repeated several times, each time advancing the starting position a few degrees until the entire annular peripheral area of the eye is tested. The recorded peripheral area of best vision and recorded incident and wedge angle A for that position is determined.

A Sloan-Lighthouse eye chart is placed or held approximately 40 cm from the person being tested. The rotating mirror assembly 22 for the eye being tested is rotated to the above-determined best angular position of peripheral vision. The pivoting mirror 34 is set at the center position of the determined wedge angle A, which is the recorded incident angle at that position. A + 3 diopter trial lens is placed in the trial lens holding means 21. At this point, the determined wedge angle A can be converted to prism diopters as discussed earlier, and the calculated prism 52 and trial lens 54 may be used in the trial lens holding means 21 to measure the vision potential of the tested eye. Use of the mirrors 32, 34 are preferred, however, since they have practically no distortion and will provide a more accurate correction for the best peripheral vision.

A standard optical procedure is applied at this time, adding or subtracting diopters to the trial lens 54 and/or cylinders until the eye discerns objects at close range. If the person being tested cannot read the letters or numbers on the chart at the 40 cm distance, the chart is moved closer until the person can read a line on the chart. The resolution of the eye can be determined by measuring the chart distance from the eye and the size of the letters being read. For far distance viewing, the above procedure is repeated except that a Sloan letter low vision chart is used at distances of 0.75 meter, 1.5 meters and at 3 meters.

The aforementioned testing procedure is repeated for the other eye. After both eyes have been tested, the determined wedge angle A for each eye is converted to prism diopters by multiplying the recorded incident angle (one-half of wedge angle A) times 1.75 as indicated earlier. The optical assemblies 22 are removed from frame 12, and the calculated prisms 52 are placed in the lens holding means 21, and the trial lens holding means rotated until the apex of each prism is positioned at the angle of best peripheral vision for each eye 48. The trial lens(es) 54 for the best close vision of each eye is placed in the trial lens holding means 21 between the eye 48 and prism 52. At this time, the Sloan-Lighthouse chart is positioned or held at a distance 40 cm from the person being tested. The person is asked to read the charts to determine that there is no distortion or diplopia present, and to determine the best resolution for the eyes. This procedure is also repeated for the far distance viewing except the chart and trial lens(es) that were determined earlier for far distance viewing will be used.

Figures 6, 7, 7A:
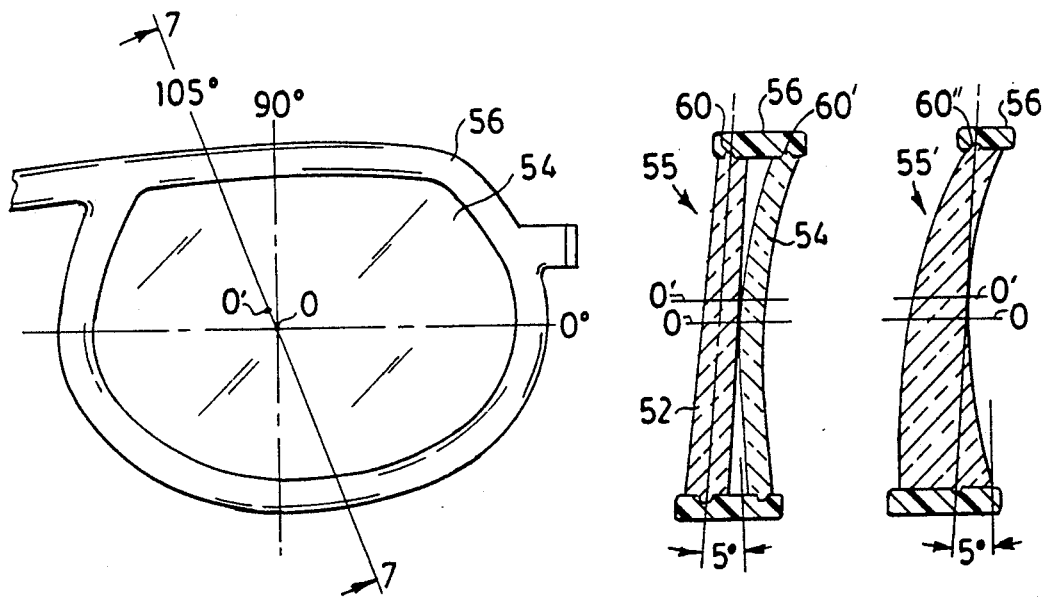
FIG. 6 is a segmental front elevational view showing one lens of prismatic eye glasses.
FIG. 7 is a section view taken substantially along line 7—7 of FIG. 6.
FIG. 7A is a section view of a similar prismatic lens.

The combination of prism 52 and trial lens(es) 54 determined by the aforementioned testing procedure comprises a prismatic lens 55, 55' as seen in FIGS. 7, 7A respectively, and are mountable in the aforementioned determined orientation in the frame of eye glasses 56, seen in part in FIG. 6. Alternatively, the prism 52 can be mounted in a double frame, not shown, by means, such as clips or hinges, the corrective lens being mounted in one set of the frames, and the prism in the other set of frames. This type of frame(s) or mounting provide the means to design any combination of glasses, such as (1) a near and far distance combination, (2) reading glasses combined with either a near or far distance combination, (3) ultra-violet filter with either a near or far distance combination, etc.

When a person first wears eye glasses 56 with prismatic lenses 55, 55' he may see double and/or distorted images. The double images can be corrected by rotating the prisms 52 until the apexes of both prisms are located precisely at the tested angular position of best peripheral vision. To reduce some prism distortion, a prism 52 having the next smaller prism diopter should be used. The phenomenon of wearing prismatic glasses for the first time is akin to a person wearing bi-focals or tri-focals for the first time.

For a person having full vision, the optical center of each corrective lens(es) 55, 55' is positioned from its zero axis to approximately 3 millimeters below the eye's optical axis O, relative to the best area of vision, so that the person may walk with his head in a normal attitude while looking forward.

For a person having peripheral vision only, a re-positioning of the optical axis (O) of up to 5 millimeters towards the position of best peripheral vision can be made, if required, to insure that images entering the eye will be perpendicular to the peripheral area. The new position of the optical axis designated O' is illustrated in exaggerated form in FIG. 6 extending at 105° which, in this example, was selected as the position of best peripheral vision. Also, to help eyes with peripheral vision to focus on frontal objects, the prismatic lens 55 can be tilted up to 5 degrees towards the center of the best peripheral vision. This is achieved in FIGS. 7, 7A by grinding lens retainer rings 60, 60', 60" respectively which are offset from the vertical by 5°. Accordingly, when the prismatic lenses 55, 55' are mounted in eye glass frames 56, the prismatic lenses can be tilted up to 5° toward the center of the best peripheral vision.

The displacement of the optical axis O and the tilt of the prismatic lenses 55, 55' will increase the refractive power (prism diopters) of the prismatic lens system without increasing the size of the prism or corrective lens(es). This reduces distortion, prism thickness, and the combined weight of the eye glasses 56 to a minimum. The increase in prism diopters depends on prism diopter size and power of the corrective lens. In one example, a prismatic lens system had a corrective lens of plus 4.5 diopters combined with a prism of 8 prism diopters. Due to displacement of the optical axis O and tilting of the prismatic lenses 55, 55', the refractive power of the system was increased approximately 3 prism diopters. The prismatic lens then responds as an 11 prism diopter lens. This method can be used when the measured prism diopters are greater than 8 prism diopters. The aforementioned displacement and tilting of the lenses will also facilitate walking with one's head in a normal attitude while looking in the forward direction.

Figure 8:
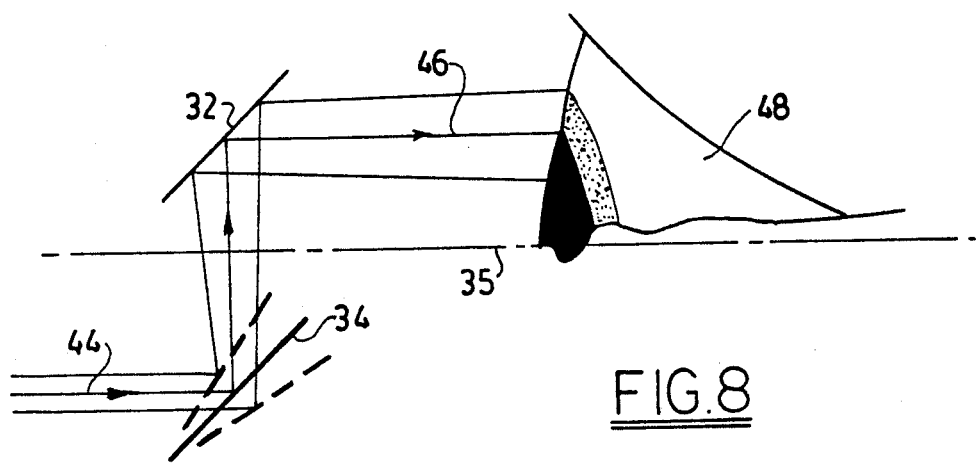
FIG. 8 is a schematic view similar to FIG. 4 of an optical system for use in examining persons having retinitis pigmentosa.

With reference to FIG. 8, a modification of this invention is illustrated for use in examining the eye of a person having retinitis pigmentosa (tunnel vision), or hemianopia, for example. In this embodiment of the invention, the positions of the fixed and pivotal mirrors 32, 34 respectively are reversed, although this is not necessary. The eye examining apparatus is used in the same manner as described heretofore, except that the rotatable ring 30 is locked on the zero or horizontal axis of the apparatus and the pivoting mirror 34 is then pivoted to determine the prism diopters required for best lateral vision for each eye. Each eye is scanned in the temporal and nasal directions, and eye glasses are then designed with determined prism diopters and corrective lens(es) 54 to provide lateral images to the visually sensitive central retina area of each eye to enlarge or expand its field of vision.

Figure 9:
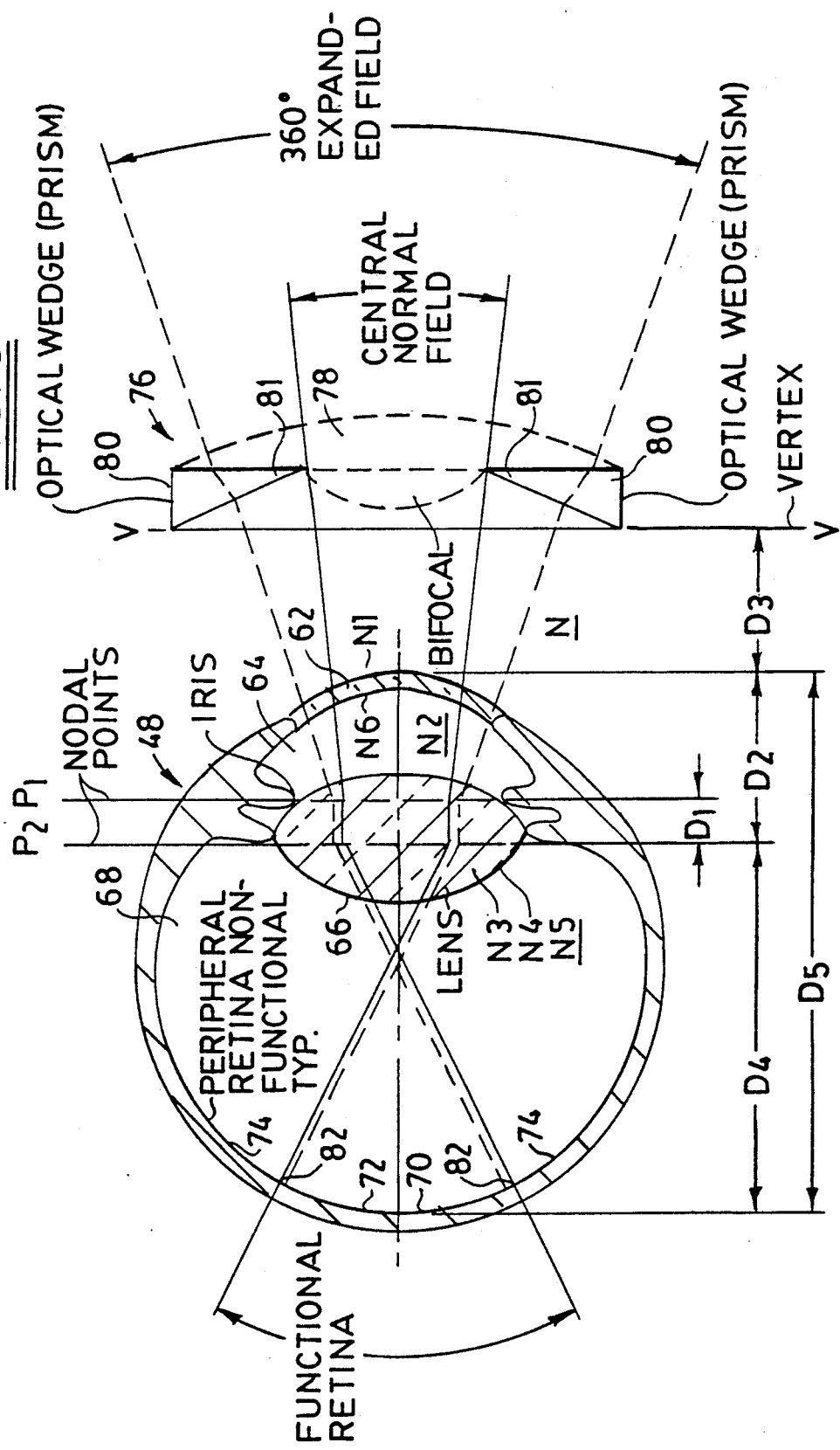
FIG. 9 is a sectional schematic view, shown exaggerated for purposes of clarity, of an eye showing a lens prismatic element designed to expand a normal central field of view by refracting images from the expanded field within and along the peripheral edge of the visually sensitive central functional area of the retina.

Referring to FIG. 9, an eye 48 of a person having retinitis pigmentosa (tunnel vision) is disclosed in exaggerated form for purposes of clarity. The eye has a cornea 62, aqueous fluid 64, lens 66, vitreous solution 68, and a retina 70, which for a person having retinitis pigmentosa will have a central functional portion 72 that is visually sensitive to a normal central field of view, and a peripheral non-functional portion 74 that is visually insensitive. Incoming light rays are deviated while passing through the nodal or principle points of the eye designated $P_1$ and $P_2$ to project an upright image to the retina. Also, there are other rays of the same object or images that pass through the prism, lens and eye to the non-functional retina 74 which are not seen by the person, and hence are not shown for purposes of clarity the following indexes are employed: N-Air=1.0; N1-Cornea=1.376; N2-Aqueous=1.336; N3-Lens. Core=1.406; N4-Lens Cortex=1.386 and N5-Vitreous=1.336. The following assumptions were made for the eye lens: (1) Anterior -N6-is not aspheric; (2) Both radii of lens are not aspheric; and (3) for calculation, the indexes were averaged. With respect to the distance as shown in FIG. 9, $D1=.025$mm; $D2=9.4$mm; $D3=13.75$mm; $D4=15$mm; and $D5=24.4$mm.

It was discovered that such a person's field of view could be expanded by initially positioning an eye glass or lens element 76 at the vertex position V—V of the eye, having a non-prism area or portion 78 for accommodating the person's normal functional central field of view. By incorporating prisms 80 in the eye glass 76 with the apexes 81 thereof accurately positioned at the periphery of the non-prism portion 78, it was discovered that an expanded field of view was refracted onto and within the peripheral edge 82 of the visually sensitive functional area 72 of the retina 70 to expand the field of view, without any substantial distortion or diplopia. Positioning of the apexes 81 at the periphery of the non-prism portion 78 is critical—if positioned too far inwardly, diplopia will occur, and if positioned too far outwardly, a blind spot will result. A blind spot will also result if the apex of the prism(s) is not knife edge sharp. Although the apexes 81 appear to be parallel to one another in FIG. 10, it should be understood that the apexes could be tapered or non-parallel depending upon the shape of the person's visually sensitive functional area of the retina.

With reference to FIGS. 10-12, a pair of lens elements 76 are shown mounted in a conventional eye glasses frame 86 to provide prismatic eye glasses 84, for achieving adequate expanded field of view for a person suffering from retinitis pigmentosa.

FIG. 11 is a sectional top plan view of lens 76 shown exaggerated for clarity. It discloses the method for manufacturing prescription corrected field expanding lens 76 with bifocal. Prisms 80, non-prism area 78, bifocal 162 and the RX base curve 161 are molded as an integral unit. The prescription RX 160 is ground and polished as required after a patient has been tested and their acuity measured. (See enclosed sample lens 76.)

FIG. 12 is a top plan view 86 and 88 showing the overall thickness of a complete prescription corrected field expanding lenses 84 mounted into a standard spectacle frame. It was discovered that a pair of opposed prisms 80 of a desired power arranged or positioned substantially symmetrical relative to a horizontal line A—A of the lens element extending through its optic axis O could effectively horizontally expand the normal central field of view. Another prism 80 interposed between the opposed prisms 80 and extending below the A—A axis substantially along a vertical B—B axis extending through the optic axis O of the lens element could effectively expand the normal central field of view downwardly. Accordingly, it was discovered that lens elements 76 having a central non-prism area 78 and only three prisms 80 could effectively and adequately expand a person's central visual field of view in the required horizontal and vertical directions for a person suffering from retinitis pigmentosa. It was further discovered that eye glasses 88 having substantially half of each lens element 76 with a non-prism area 78 and the remainder of the lens element provided with a prism 80, as seen in FIG. 12, could effectively expand a person's field of view in the required horizontal and vertical directions for a person suffering from hemianopia.

Figure 29:
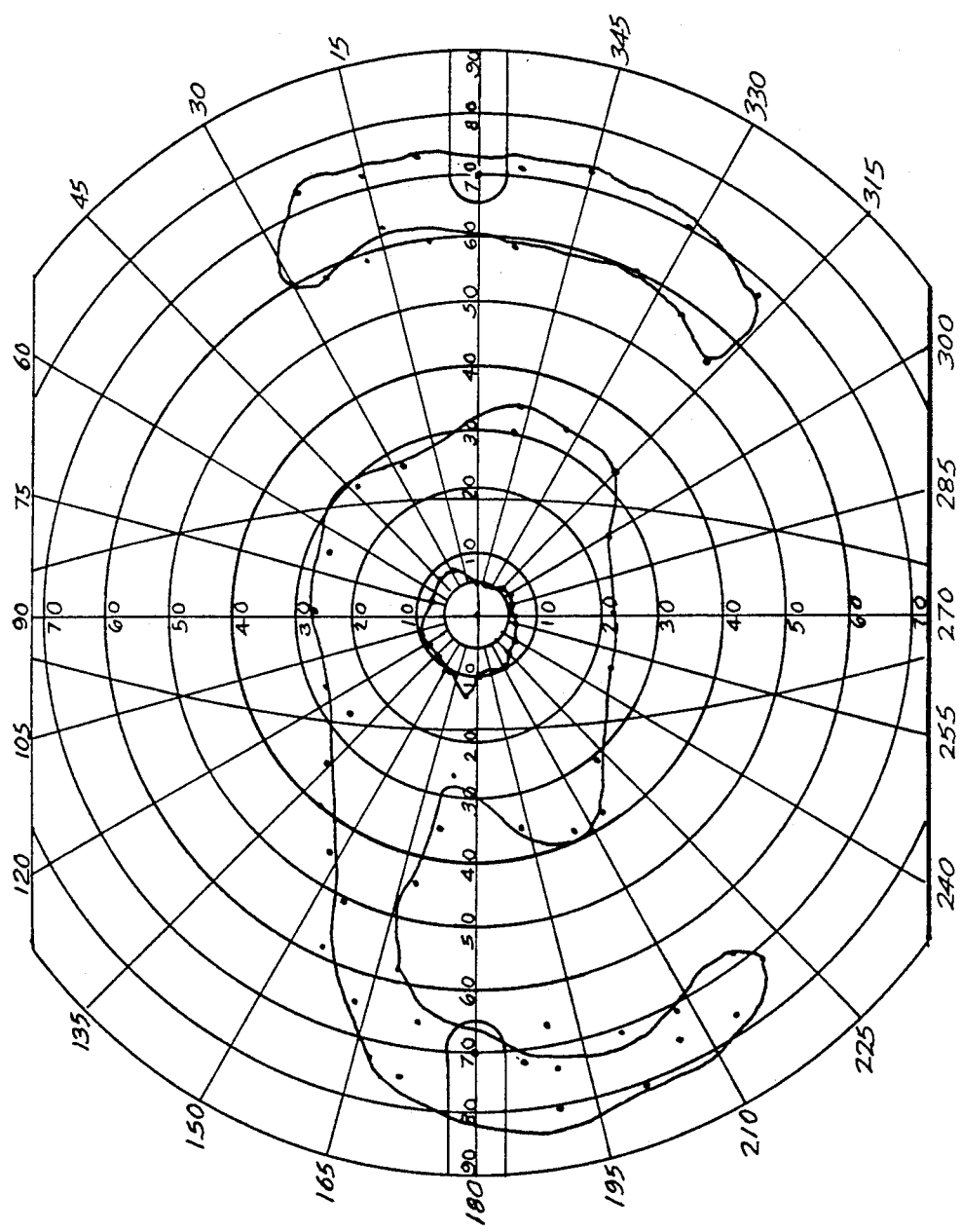
FIG. 29 is a typical plan view of a chart used in a conventional perimeter testing apparatus for measuring the total retinal field of view for a person wearing prismatic clip-on eye glasses which are clipped onto the frame of conventional prescription corrected eye glasses.

With reference to FIG. 14, field expanding eye glasses 89 can be mounted in a frame that is adapted to be clipped onto the person's regular prescription glasses, by any suitable means, not shown. The regular glasses properly focus the person's normal central visual field of view, whereas the clip-on eye glasses 89 shift the expanded portion of the field within and along the peripheral edge of the visually sensitive central functional area of the retina. The clip-on eye glasses 89 are preferably made by any suitable molding process, or the like, of any suitable filter material, such as CORNING CPF 511. The expanded field of view obtained on a conventional perimeter testing chart by such clip-on eye glasses 89 for a particular person is illustrated in FIG. 29.

The aforementioned field expanding eye glasses for retinitis pigmentosa and hemianopia expand a person's normal central field of vision without eye movement, and in addition can be prescription corrected for each person, and the vision can be corrected to near or reading acuity with bifocals. In the field expanding eye glasses shown in FIGS. 10-12, the prism apexes and joints are shown exaggerated for purposes of clarity. These lenses cannot be manufactured by conventional standard ways of producing prescription lenses. Instead, these lenses must be molded by intricately designed molds which provide properly positioned prisms with razor or knife sharp prism apexes. The molds also provide the lenses with a prescription base curve and bifocals. In the molded production lens, the apex lines and prism joint are practically invisible in the eye glasses when worn by a person. Also, the weight of the prescription corrected field expanding eye glasses will vary from approximately 1.5 ounces to 2.0 ounces, depending upon the choice of eye glass frame and lens size.

Figure 15:
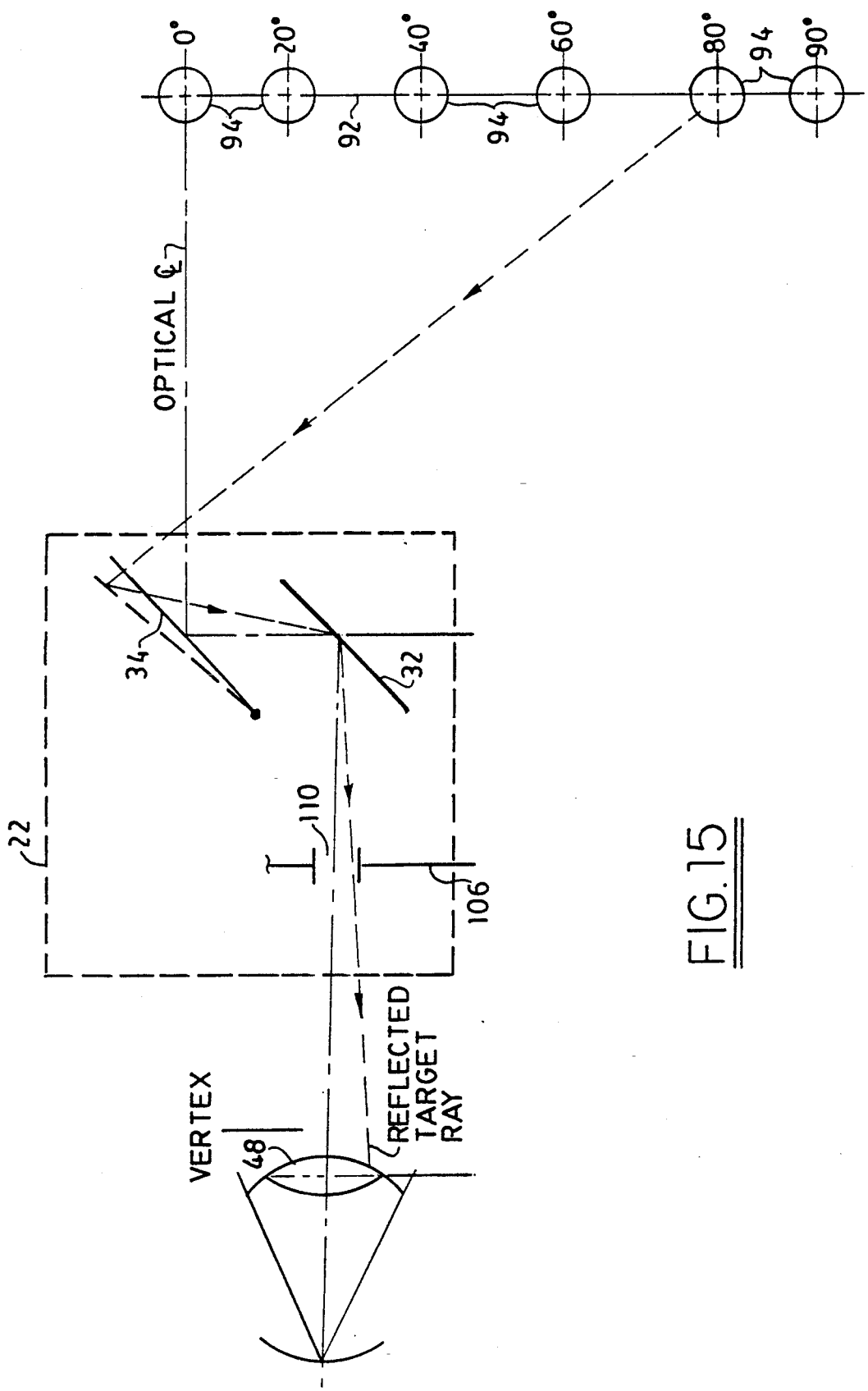
FIG. 15 is a schematic view of the optical system of an eye examining apparatus usable in determining the possible expanded field of view for a person suffering from retinitis pigmentosa and hemianopia.
Figure 16:
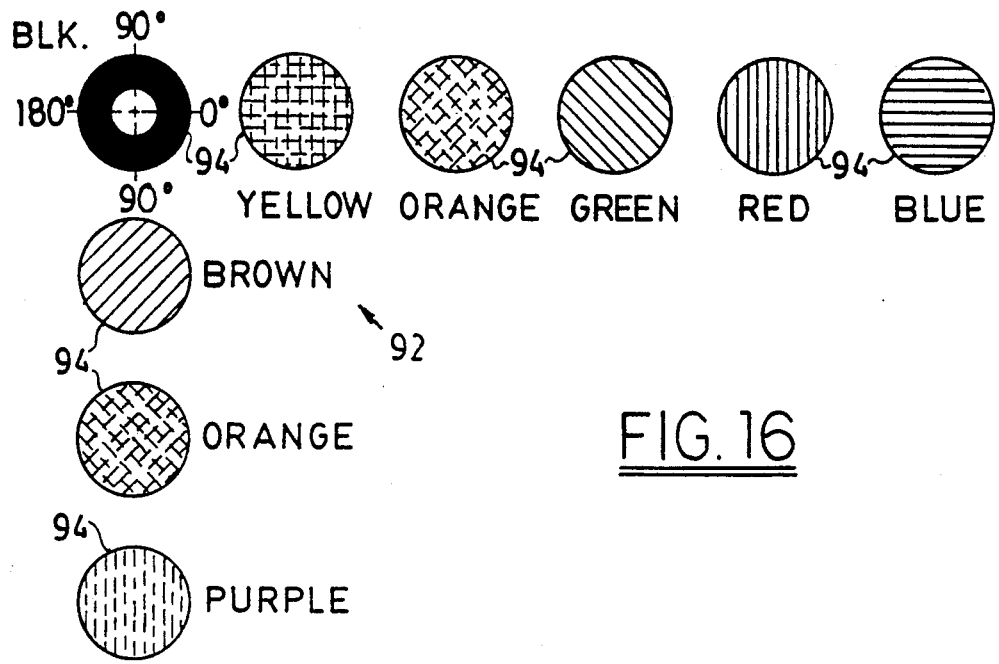
FIGS. 16 and 17 are front elevational views of eye charts for use with the eye examining apparatus optical testing procedure of FIG. 15.
Figure 17:
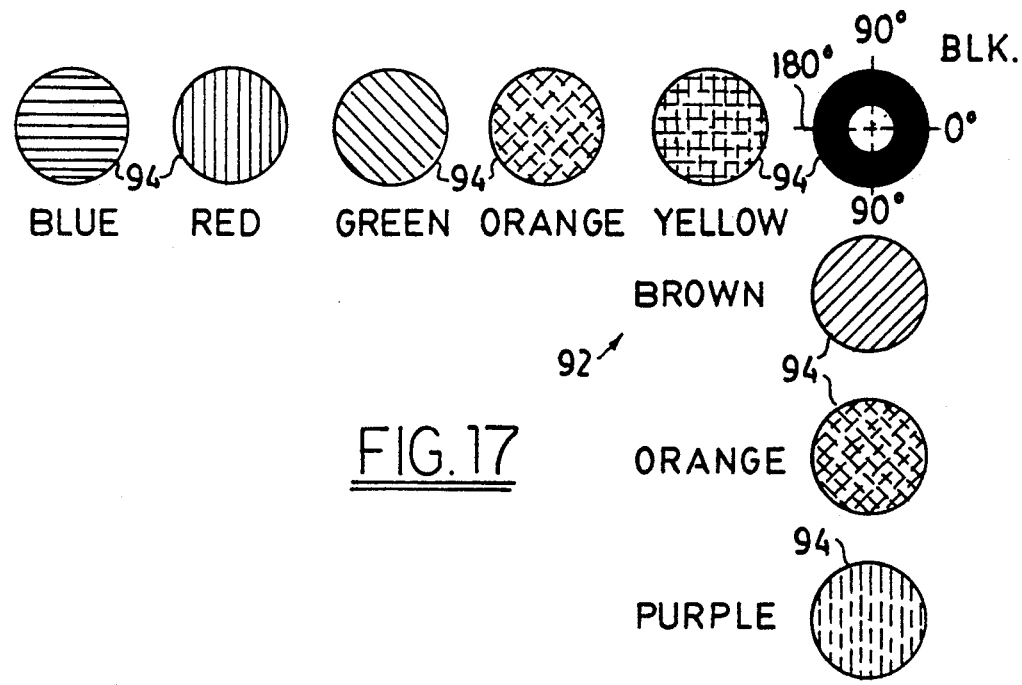

Referring to FIG. 15, a preferred method for measuring the expanded field for a patient having retinitis pigmentosa (tunnel vision) and hemianopia, and providing improved prismatic eye glasses 84, 88, 89 of the type shown in FIGS. 10-14, for a person will now be described. Initially, the eye examining apparatus 10 is mounted on a mounting device 90 of the type shown in FIGS. 32—34, to be described later, and is laterally, tiltably and rotatably adjustable by suitable adjusting means to position its C—C axis (FIG. 1) on the optic axis O of the person to be tested. One eye 48 of the person is covered, and as indicated in a previous paragraph, the rotatable ring 30 of the optical assembly 22 of the eye examining apparatus 10 is rotated for the eye being tested from its normal position shown in FIG. 1 to a position in which index 33 is locked on the horizontal C—C axis of the apparatus. A specifically designed eye chart 92 for each eye, as seen in FIGS. 16 and 17, is positioned 40 cm from the eye being tested. Assuming that the eye being tested has a tunnel vision of approximately 10°, the person being tested should then clearly see the first circle 94 of the test chart 92, which will be conveniently colored a specific color, such as black, for example. Maintaining ring 30 in its locked position, mirror 34 is slowly pivoted, thus simulating the introduction of a prism 80 into the system. The person looking into the fixed mirror 32 is requested to indicate whether or not he notices any diplopia, blind spots, or can see any additional colored circles.

Movement of the pivotal mirror 34 is continued in the temporal direction with the person looking straight ahead with the tested eye, until the person can no longer see any additional colored circles 94. The pivotal mirror 34 is then returned to the point at which the person most clearly sees the furthermost colored circle. Assuming, as shown in FIG. 15, that the person is able to clearly see the fifth circle 94 with his tested eye, this would indicate that a properly positioned prism 80 along the horizontal axis A—A of a lens element would expand the person's field of view in the temporal direction from 10° to approximately 80°. For that eye in the temporal position, the power of the prism 80 or prism diopters required to provide this laterally expanded field of view is read directly from the diopter scale on the eye examining apparatus 10.

The rotatable ring 30 is unlocked, rotated through an angle of 180°, and again locked along the horizontal axis C—C of the examining apparatus 10 to measure the possible laterally expanded field in the nasal direction on the opposite side of the tested eye. The same procedure is followed utilizing the eye chart 92 of FIG. 17, having similarly colored circles 94 extending in the opposite nasal direction. Assuming again that the person is able to see the fifth colored circle 94 on the left, the prism diopters of a prism 80 required to obtain this laterally expanded field of view in the nasal direction would again be read directly from the eye examining apparatus 10.

Figure 18:
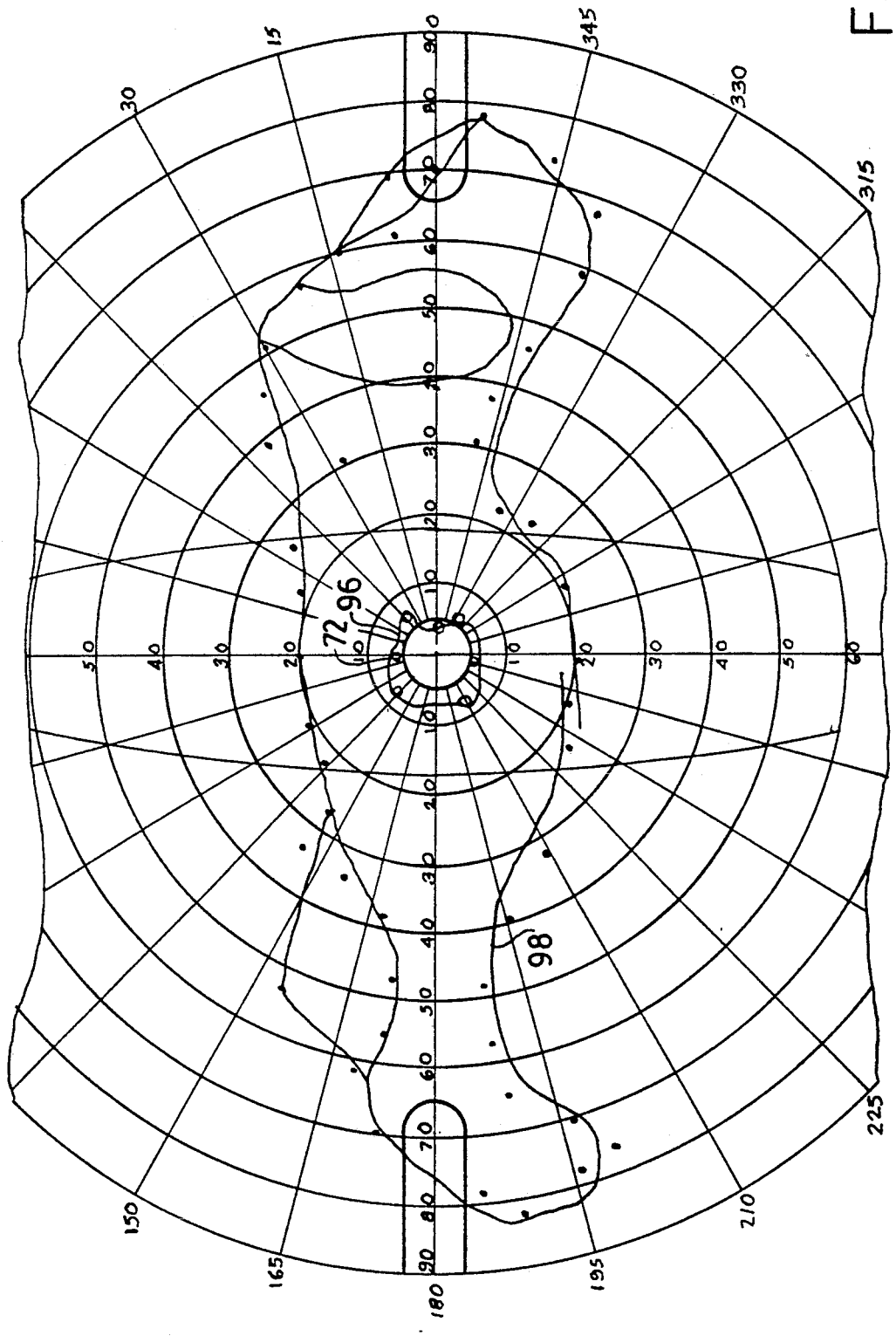
FIG. 18 is a typical top plan view of a chart used in a conventional perimeter testing apparatus for measuring a person's total retinal field of view, and shows the expanded field superimposed with a normal central field.

Having completed the testing for the one eye, the same procedure is followed for the other eye with the previously tested eye covered. The eye is tested in the temporal and nasal directions to obtain the prism diopters of the prisms required to obtain the maximum expanded field of view for the tested eye. Let us assume the person is able to see the fifth colored circle 94 in the temporal and nasal direction for the other tested eye. Accordingly, to provide a total expanded field of view of approximately 160° for a person having tunnel vision of 10°, it is necessary, as described earlier, to provide each lens element of the eye glasses 84, 88, 89 with a pair of opposed prisms 80 that are substantially symmetrical with axis A—A (FIG. 10). With the apexes 81 thereof positioned along the normal central field of view of each lens, the images refracted by the prisms 80 will fall within and along the peripheral edge of the visually sensitive central area 70 of the retina 72 of each eye, for expanding the normal central field of view of each eye without any substantial distortion and diplopia. The total expanded field of view for the person can be tested and confirmed by a conventional perimeter testing apparatus to obtain the expanded field of view of substantially 160° along the horizontal axis A—A and substantially 20° above and below the horizontal axis along the vertical axis for the designed eye glasses, as seen in FIG. 18. The visually sensitive central area 70 is denoted by endless line 96, and the total expanded field of view is denoted by endless line 98. The expanded field of view obtained on the chart FIG. 18 was obtained on a conventional perimeter testing apparatus with the field expanding glasses (FIG. 10) for a particular person.

Utilizing the same procedure, the rotatable ring 30 can be unlocked, rotated 90° to position index 33 on line D—D opposite the index position shown in FIG. 1, locked, and the pivotal mirror 34 operated in conjunction with the vertically arranged colored circles 94 of the test chart 92 shown in FIGS. 16 and 17. This test procedure will indicate the prism diopters of power required to laterally expand the patient's field of view in a downward, vertical direction. The same procedure could be used to expand the person's field in a vertical plane upwardly, but since such field expansion would be of little value to the person, there is usually no need to do this.

Although two separate eye test charts of the type shown in FIGS. 16 and 17 are used, it should be understood that the two charts could be combined in a single eye test chart in which the colored circles extend laterally in both directions from the upper circle of a vertically downwardly oriented line of circles.

Figure 19:
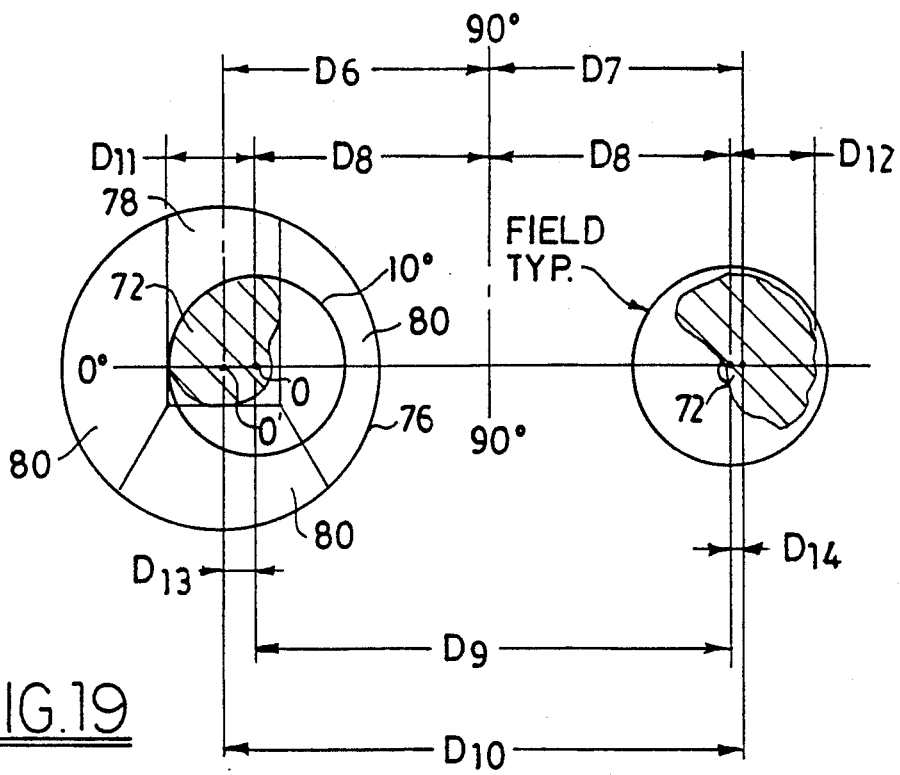
FIG. 19 is a schematic view showing the location of the functional visually sensitive central areas of the eyes and the expanded pupilary distance due to the offset between the centers of the pupil and the centers of the visually sensitive central areas.
Figures 21, 22:
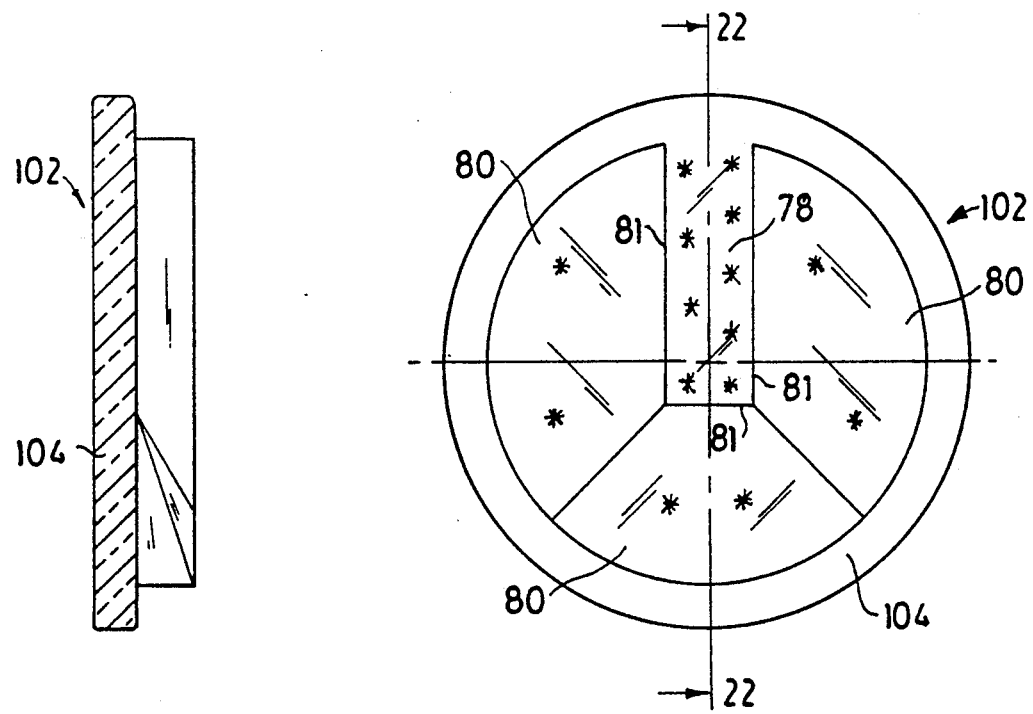
FIG. 21 is a front elevational view of a test prism for use in subjectively determining prismatic field expanding eye glasses for a person suffering from retinitis pigmentosa.
FIG. 22 is a section view taken substantially along line 22—22 of the test prism of FIG. 21.
Figures 23, 24:
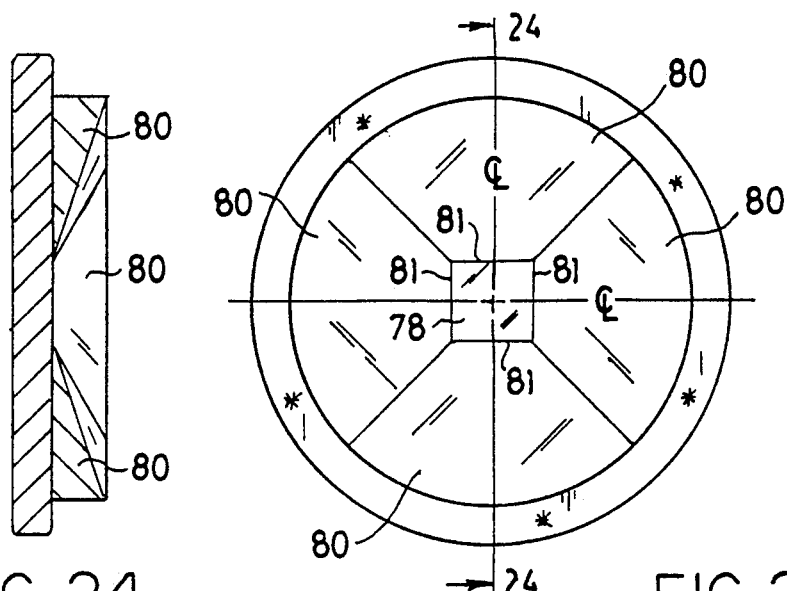
FIG. 23 is a view similar to FIG. 21 of another modification of the test prism.
FIG. 24 is a section view taken substantially along line 24—24 of the test prism of FIG. 23.

Having previously measured the expanded field for a specific person, lens members 76 are designed for the specific person, each having a central non-prism area or portion 78 for accommodating the normal central visual field of view and prescription of the person, and a prism area, such that expanded light rays pass through the normal central field of view of the lens elements, and are refracted on the functional portion or visually sensitive central area of the retina. As indicated earlier, this central field or tunnel of the patient is expanded by a pair of opposed prisms 80 for each eye of the required prism diopters with the apex 81 of each prism along the periphery of the non-prism portion of the lens member, which accommodates the patient's normal field of view. Where the functional retina 72 is slightly offset from the measured pupilary distance for a specific person, the frame 86 of the pair of eye glasses is designed to space the lens members 76 so that the center of the non-prism portions 78 of the lens members 76 substantially coincide with the centers of the visually sensitive functional central area 72 of the retina 70, as seen for only one eye in FIG. 19. Referring to FIG. 19, the following exemplary values are assigned: D6=39mm; D7=37mm; D8=35mm; D9=mean average of 74mm; with a measured value of 70mm to center line of pupils; D10=76mm; D11=8.0mm; D12=7.0mm; D13=4.0mm and D14=2.0mm. The non-prism portions 78 of the lens elements are prescription corrected to accommodate the person's refracted acuity. The person's eye are individually refracted in a conventional manner to obtain prescription values for the best possible acuity for the person. For near or reading distances, normal refraction procedures are used to determine the prescription values for bifocals.

As indicated earlier with reference to the "clip-on" eye glasses of FIG. 14, the eye glasses are non-prescription field expanders that clip onto a normal prescription eye glass frame. They can involve either a three or four prism concept and can be made in various filter densities to accommodate each person. The expanded field (prisms and non-prism areas) is measured in the same manner as discussed heretofore for field expanding eye glasses.

After all the pertinent information and data obtained by the eye examining apparatus has been tabulated, a prescription is prepared on a form of the type illustrated in FIG. 20, to enable an optician to manufacture the lens elements and mount them in eye glasses.

For a patient suffering from hemianopia, in which a semi-cylindrical portion of the retina is functional, and the remainder non-functional, eye glasses are designed, of the type shown in FIG. 12. For this condition, the lateral expanded field along the horizontal axis A—A is measured by the same procedure used for the person having retinitis pigmentosa. When the pivotal mirror 34 is moved to the position of best vision for the person, the prism diopters are read directly from the diopter scale, and such a prism 80 is incorporated in the lens elements 76 of the eye glasses 88. Once again, the apex 81 of the prism 80 is adjacent to the non-prism semi-circular or half portion 78 of the eye glass 76, so that the expanded field image is refracted along and within the peripheral edge of the visually sensitive functional portion 70 of the retina 72. As indicated earlier, the location of the apex 81 relative to the non-prism portion or area 78 is critical, because if the non-prism area is too narrow, diplopia will occur, whereas if the non-prism area 78 is too large, a blind spot will occur between the periphery of the functional retina 72 and the expanded field. Where applicable, the lens elements of the eye glasses 88 may be provided with bifocals to improve the near or reading distance viewing.

Another method of measuring the expanded field for patients with retinitis pigmentosa or hemianopia involves using a conventional eye examining apparatus 10 that has been modified to provide a central circular field stop or aperture 110. Trial prisms 102 are provided of the type illustrated in FIGS. 21-24. Each trial prism is provided with a clear plastic or glass base support 104 onto which are mounted three or four prisms 80, each of the same prism diopters. Each trial prism 102 will have prism diopters of power ranging from 6 diopters to at least approximately 20 diopters. The trial prisms 102 will further be provided with a varying non-prism area or portions 78 of a varying width for accommodating normal central fields of vision varying from approximately 5° to 50°. This will require 60 or more trial prisms 102. By subjective testing with the trial prisms 102 in the modified test apparatus 10, the prism diopters of power required for optimum vision is obtained, along with the proper non-prism area or portion 78 for minimizing diplopia and/or blind spots. Normal refraction procedure is used to obtain the best possible acuity for the non-prism area.

Figure 25:
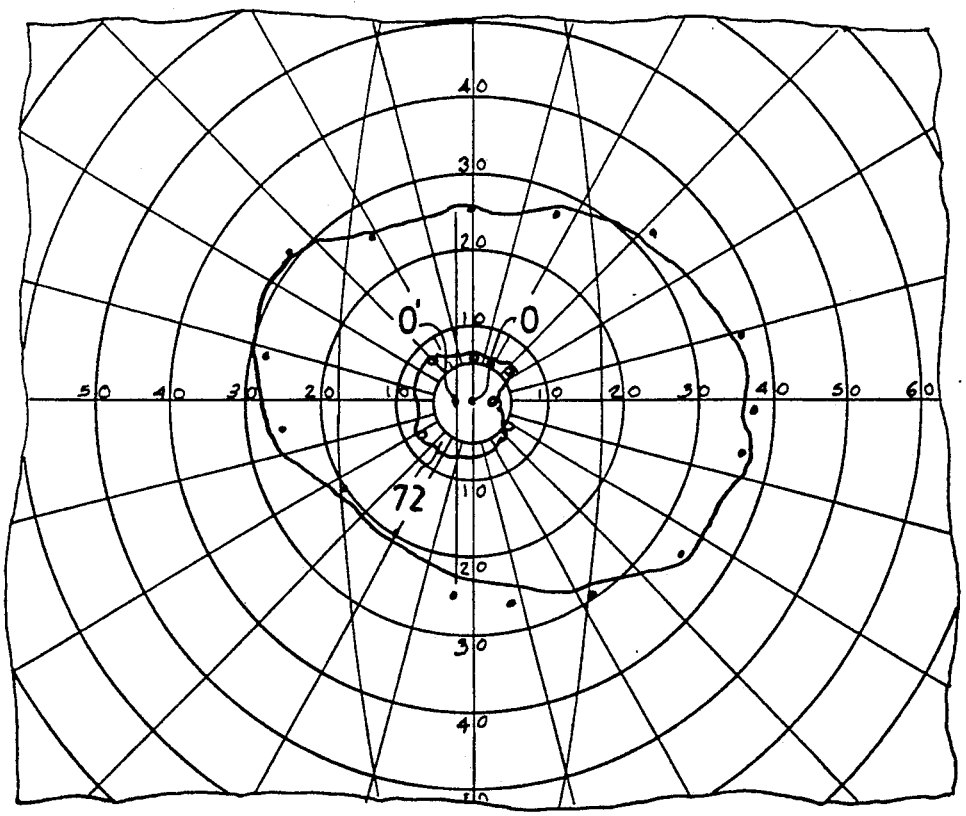
FIG. 25 is a typical top plan view of a chart from a perimeter testing apparatus showing a person's visually sensitive, functional, central retinal field of view.

Still another method for measuring the expanded field for a person suffering from retinitis pigmentosa or hemianopia involves obtaining the normal visually sensitive central functional portion or retina field 72 of each eye of the person on a conventional perimeter testing apparatus. With reference to FIGS. 19 and 25, the visually sensitive retina field 72 for one eye of a person is observed on the perimeter testing chart to fall within a 10° field, but has a center O' slightly offset from the center or optic axis 0. A similar determination is made for the other eye. Accordingly, to make a pair of prismatic eye glasses 84, 89 for such a person, a non-prism portion 78 of each lens element 76 is selected of a width substantially equal to the width of the normal central retina field 72 of each eye. Then, utilizing the aforementioned Snell's Law and derivations therefrom, and making assumptions for the indexes of the cornea 62, aqueous 64, lens 66, and vitreous 68, the distance between the nodal points, etc., it is possible to mathematically calculate the pertinent data needed, such as the prism diopters of power for prisms 80 required to surround the non-prism portion 78 to refract an expanded field image along and within the peripheral edge of the functional or central visually sensitive retina field 72. The calculations can be made by any suitable calculation procedures. Knowing the sizes of the non-prism portions 78, and the sizes in diopter of the prisms 80 surrounding the non-prism portions, the pupilary distance between the centers of the visually sensitive central retina fields 72 to place them in the non-prism areas 78 of the lens elements 76 can be calculated. As indicated earlier, this is necessary in those instances where the visually sensitive retina field 72 is offset from the normal pupilary distance between the eyes, as shown in FIG. 19. Having obtained all of the pertinent data, a prescription of the form shown in FIG. 20 can be prepared to enable an optician to make the prismatic eye glasses.

Figures 26A, 26B:
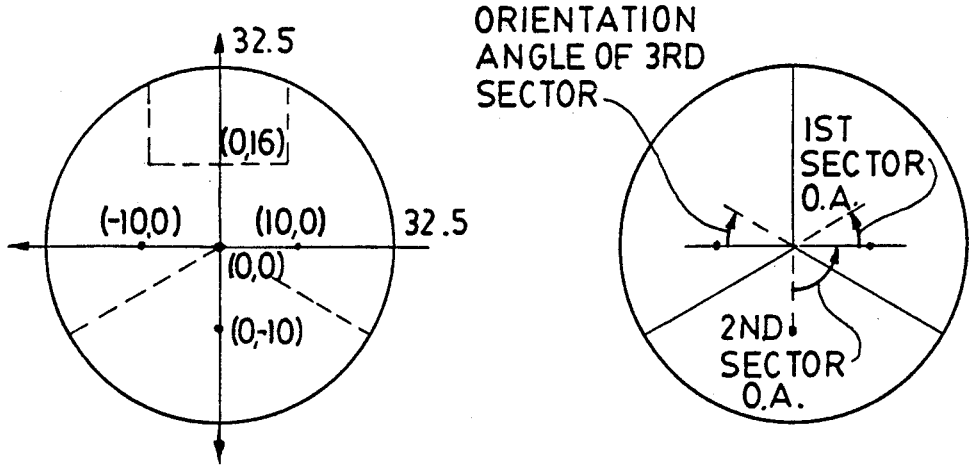
FIG. 26, 26A and 26B are top plan views showing the application of computer analysis in three dimensions for tracing a ray of light through each prism and eyeball to find its intersection with the retina at the X-Y-Z axis.
Figure 26:
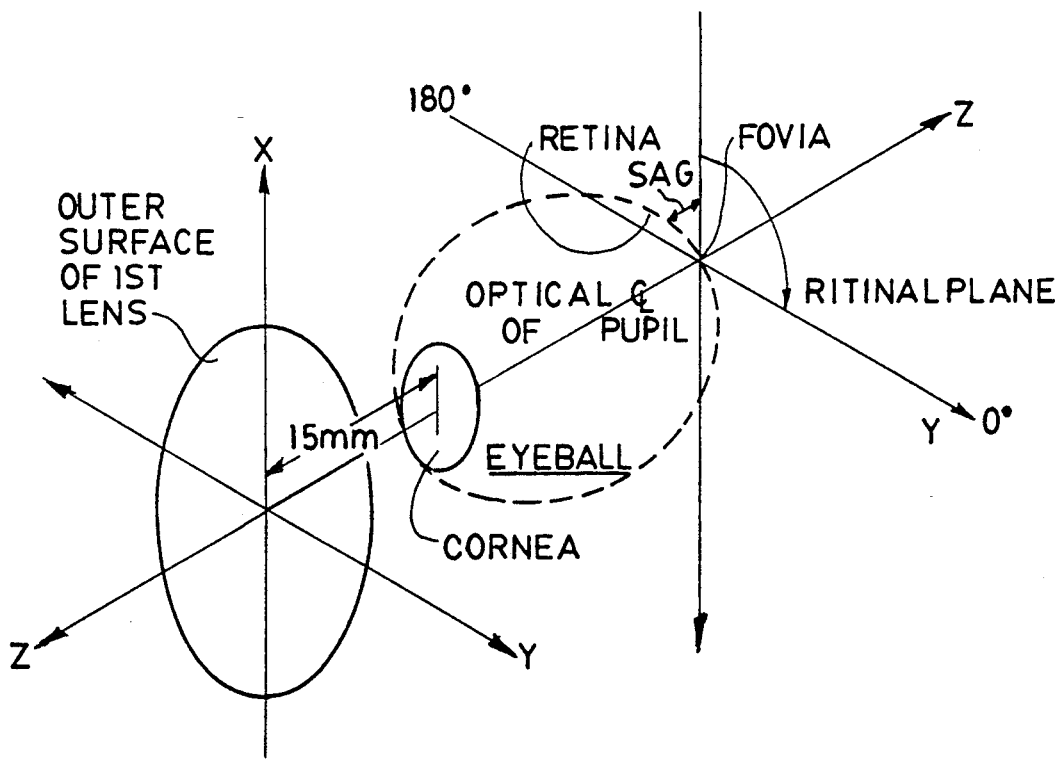
Figure 27:
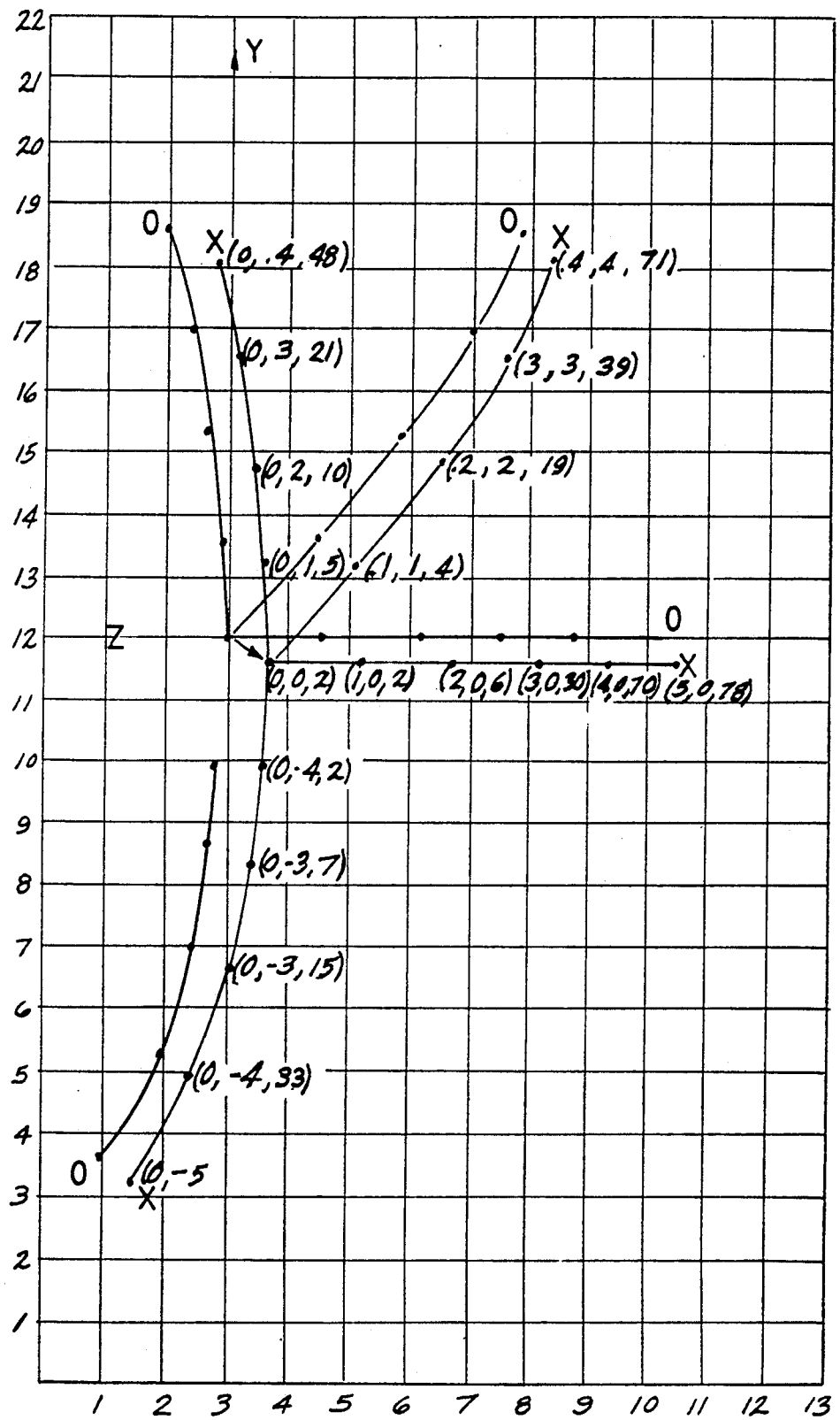
FIG. 27 is a graph showing the magnitude of the shifts of a ray of light at the points (−10,0) and (10,0) for five diopters of prism power.
Figure 28:
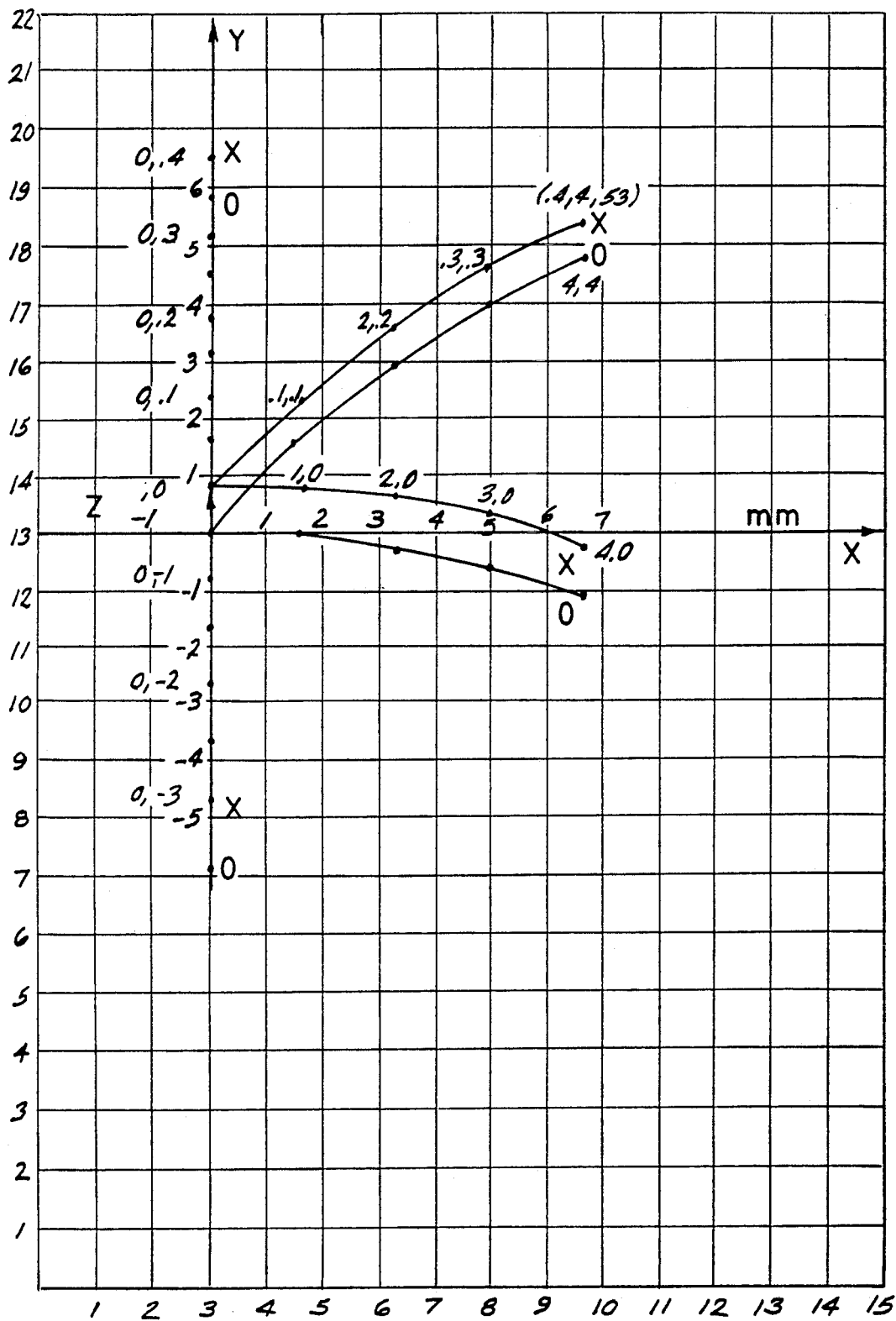
FIG. 28 is a graph showing the magnitude of the shift of a ray of light at the point (0,−10) for five diopters of prism power.

With reference to FIGS. 26-28, still another method is disclosed for measuring the expanded field of view for a person suffering from retinitis pigmentosa or hemianopia. This method involves the application of computer analysis in three dimensions for tracing a ray of light through each prism and eyeball to find its intersection with the retina. The points $(-10,0)$, $(10,0)$ and $(0,-10)$ were chosen because of their near symmetry. In each case, the shift of the image is inward in the direction of the orientation angle of the prism. In other words, a ray going through the upper right or left prism is shifted inwards toward the vertical at an angle of thirty degrees to the horizontal (FIG. 26). The inward shift of a ray going through the lower central prism is shifted directly upwardly since the orientation angle of that prism is ninety degrees to the horizontal. The magnitude of the shifts at the points $(-10,0)$ and $(10,0)$ for five at the point $(0,-10)$ is 0.814 mm (FIG. 28). The shift in image for prisms of a different diopter of power can be extrapolated from the above findings.

Figure 30:
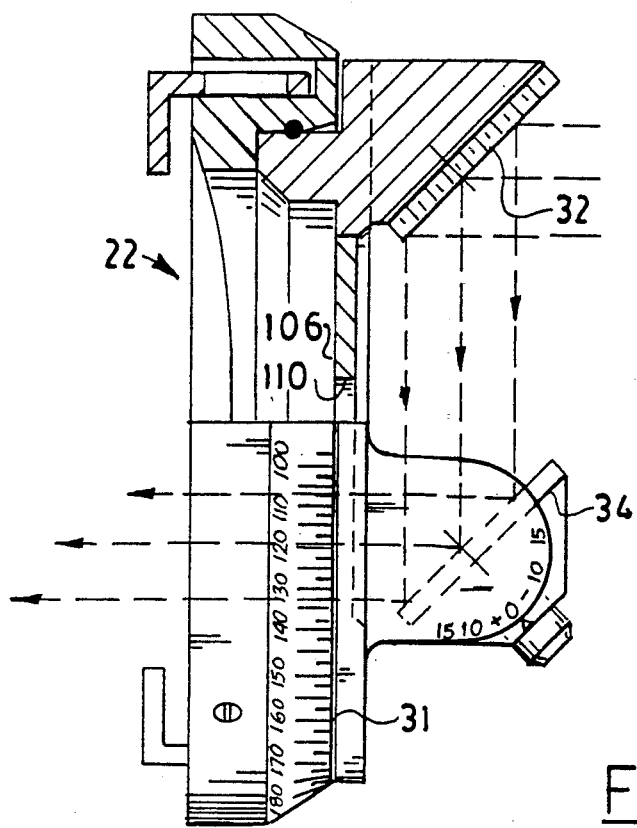
FIG. 30 is an enlarged side elevational view, partially in section, of an optical simulated prism assembly provided with a field stop plate having a central aperture.
Figure 31:
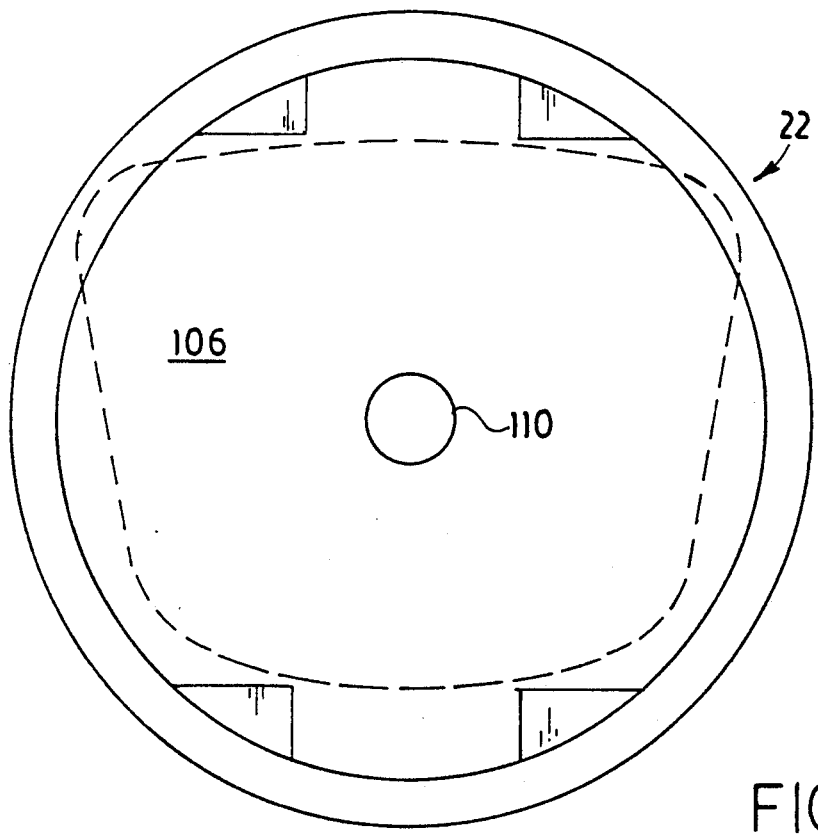
FIG. 31 is a left side end view of the optical simulated prism assembly of FIG. 30.

When the eye examining apparatus 10 is used for measuring the expanded field for a person having retinitis pigmentosa or hemianopia, a field stop plate 106 (FIGS. 15, 30, 31) of the optical simulated prism assembly 22 is provided with a central aperture 110 of varying diameter, depending upon the size in degrees of the visually sensitive central field of vision of the person being tested.

Figure 32:
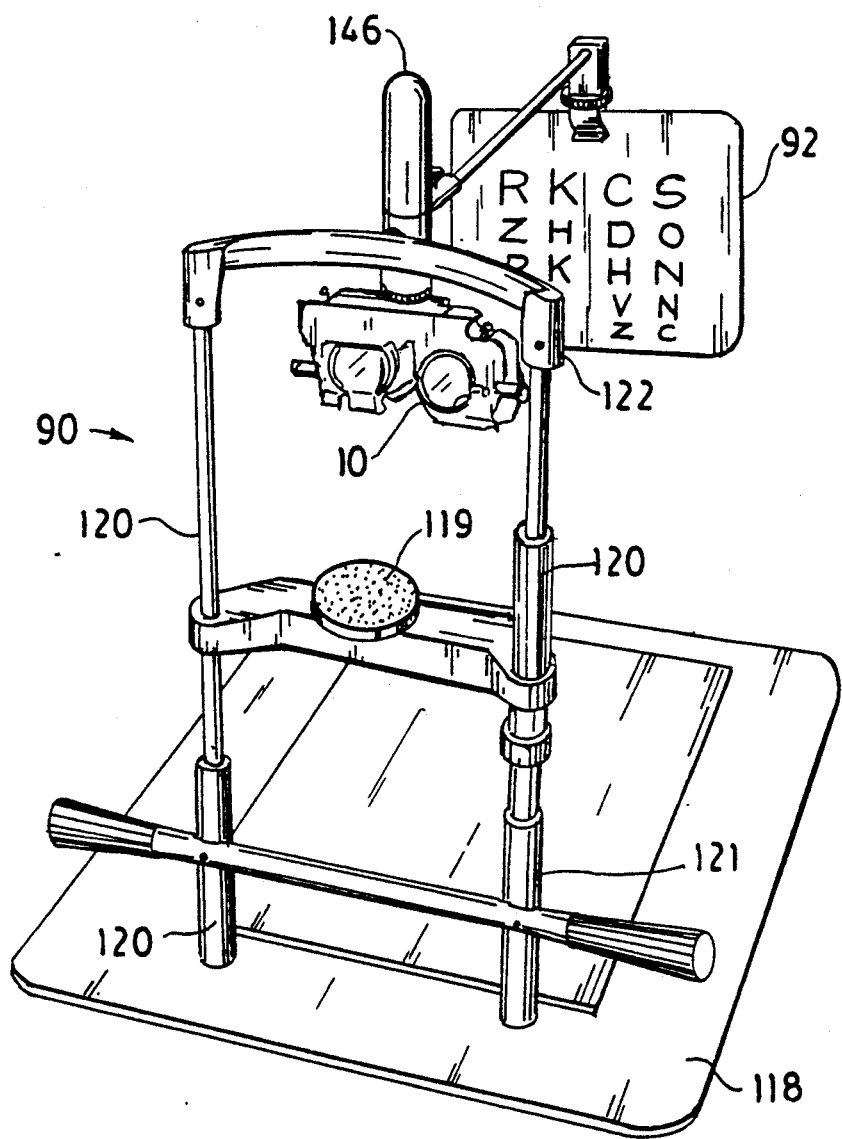
FIG. 32 is a perspective view of a mounting device for supporting the eye examining apparatus and eye test charts at pre-measured distances.

With reference to FIGS. 32-34, a redesigned mounting device 90 is illustrated for refracting and measuring expanded fields for persons suffering from retinitis pigmentosa and hemianopia. It can also be used for refracting for persons suffering from macular degeneration. The mounting device 90 supports the eye examining apparatus 10, the chin of a person being tested, and positions the eye test charts 92 a precise distance from the retina of an eye being tested. The mounting device 90 comprises a conventional base assembly having a base 118, a pair of upright support rods 120, a C-shaped support bracket 122 mounted on the ends of support rods 120, and a chin support member 119 slidably mounted on support rods 120. A conventional adjusting screw-type member 121 is provided on chin support member 119 for adjusting the position of the chin support member for each person.

The support bracket 122 has a smooth central cylindrical opening 124 through which an elongated screw adapter 126 extends. The lower end portion 125 of screw adapter 126 has a non-circular aligning recess 127 (FIG. 33) for receiving a similar shaped projection 129 on the upper bracket 12 of the eye examining apparatus 10. The eye examining apparatus 10 is secured to end portion 125 by a screw 131.

A rod-chart support bracket 128 has a smooth cylindrical opening 130 through which screw adapter 126 extends. Bracket 128 has a blind bore 134 of square-shaped cross section for receiving one end of an elongated rod 136 of a complementary square-shaped cross section. The rod 136 is secured to bracket 128 by a set screw 144. A scale 138 in centimeters from 10 to 50 is inscribed on the rod 136. A test chart holder 140 is slidably mounted on the rod 136, and has a clip 142 for holding an eye test chart 92 of any suitable type.

Vertical adjustment of the eye examining apparatus 10 relative to an eye test chart 92 is achieved by a bullet-shaped screw cap 146 which is threaded onto one end of the screw adapter 126, and a locking ring 148 which is threaded onto the opposite end. To vertically adjust the eye examining apparatus 10, the locking ring 148 is loosened, and the screw cap 146 is turned to vertically adjust screw adapter 126 and the eye examining apparatus 10 supported thereby. When the desired position is achieved, the locking ring 148 is tightened to secure the eye examining apparatus in the desired position.

With reference to FIGS. 33 and 34, to properly align the screw adapter 126 to support bracket 122 and to rod-chart support bracket 128, a pair of conventional Woodruf keys 150 is interposed between an elongated key slot 152 in the screw adapter 126 and key recesses 154, 156 in support bracket 122 and rod-chart support bracket 128 respectively. The keys 150 and slot 152 maintain the eye examining apparatus 10, screw adapter 126, and rod-chart support bracket 128 in a properly aligned position for all positions of vertical adjustment of the eye examining apparatus.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A method of making prismatic eye glasses for an eye of a person having a visually sensitive central functional area of the retina visually responsive to a normal central field of view, and having at least a partially insensitive peripheral area of the retina, comprising the steps of:

providing a lens member for the eye having an optic axis, a front surface and a rear surface;

incorporating an integral central converging non-prism portion in the lens member through which light rays within the normal central field of view pass when the eye glasses are mounted on the person;

incorporating an integral diverging prism having an apex and a base on the rear surface of the lens member, with the apex of the prism positioned adjacent the central converging non-prism portion and with the base of the prism extending outwardly toward the outer periphery of the lens member; and determining the power of the diverging prism for refracting an image from a field outside the normal central field of view within and along the peripheral edge of the visually sensitive central area of the retina for expanding the normal central field of view without any substantial distortion, diplopia or blind spots.

2. A method of making prismatic eye glasses according to claim 1, wherein when the lens member is mounted in a substantially vertical plane, the prism lies substantially in the plane of the lens member, substantially symmetrical to a horizontal axis of the lens member passing through the optic axis of the lens member for laterally expanding the normal central field of view along the horizontal axis.

3. A method of making prismatic eye glasses according to claim 1, wherein when the lens member is mounted in a substantially vertical plane, the prism lies substantially in the plane of the lens member substantially symmetrical to a vertical axis of the lens member passing through the optic axis of the lens member for laterally expanding the normal central field of view downwardly along the vertical axis.

4. A method of making prismatic eye glasses according to claim 3, comprising the further step of providing a bifocal lens on the prism.

5. A method of making prismatic eye glasses according to claim 1, comprising incorporating a pair of opposed prisms in the lens member lying in the plane of the lens member substantially symmetrical to a horizontal axis of the lens member passing through the optic axis of the lens member, for laterally expanding the normal central field of view in both directions from the optic axis along the horizontal axis.

6. A method of making prismatic eye glasses according to claim 5, comprising incorporating a third prism in the lens member extending vertically downwardly relative to the horizontal axis for downwardly expanding the normal central field of view.

7. A method of making prismatic eye glasses according to claim 6, comprising the further step of providing a corrective prescription lens for the central non-prism portion of the lens member for focusing the incoming light rays from the normal central field of view on the visually sensitive central functional area of the retina.

8. A method of making prismatic eye glasses according to claim 7, comprising the further step of providing a bifocal lens on the third prism.

9. A method of making prismatic eye glasses according to claim 1, wherein in the incorporating step, a plurality of prisms are incorporated in the lens member positioned in angularly spaced relation, with the apexes thereof surrounding the central clear portion of the lens member, and with the bases thereof extending outwardly toward the outer periphery of the lens member.

10. A method of making prismatic eye glasses according to claim 9, comprising the further step of providing a corrective prescription lens for the central non-prism portion of the lens member for focusing the incoming light rays from the normal central field of view on the central visually sensitive functional area of the retina.

11. A method of making prismatic eye glasses according to claim 9, comprising the further step of providing a bifocal lens on the one of the prisms.

12. A method of making prismatic eye glasses according to claim 1, comprising the further step of mounting the lens members in a clip-on frame adapted to be mounted on an eye glass frame.

13. A trial prism lens insertable in an eye examining apparatus for subjectively determining the optimum expansion of the normal central field of view for a person suffering from retinitis pigmentosa, in which the person has a central visually sensitive functional area of the retina responsive to the normal central field of view, comprising:
   a single lens member having a front surface and a rear surface, and an integral converging non-prism central portion for accommodating the normal central visual field of view; and
   a plurality of integral diverging prisms at the rear surface of the lens member, each prism having the apex thereof continuous with the converging non-prism central portion and the base thereof extending radially outwardly for refracting an image outside of the normal central field of view within and along the peripheral edge of the central visually sensitive functional area of the retina for expanding the normal central field of view.

14. A trial prism lens according to claim 13 wherein three prisms are provided on the lens, wherein two of the three prisms are opposed and lie along a horizontal axis of the lens for laterally expanding the normal central field of view along the horizontal axis, and wherein the third prism is interposed between the two prisms an extends vertically downwardly relative to the horizontal axis for downwardly expanding the normal central field of view.

15. A trial prism lens according to claim 13 wherein four prisms are provided on the lens element, wherein a first pair of the four prisms are opposed and lie along a horizontal axis of the lens for laterally expanding the normal central field of view along the horizontal axis, and wherein the other pair of the four prisms are opposed and interposed between the first pair of prisms along a vertical axis of the lens for upwardly and downwardly expanding the normal central field of view.

16. Prismatic eye glasses for a person having at least one eye having a central visually sensitive functional area of the retina for receiving the normal central visual field of view, and having at least a partial insensitive peripheral area of the retina comprising:
   (a) a single integral lens member having a front surface, a rear surface, and a converging non-prism central portion for accommodating the normal central visual field of view;
   (b) three integral diverging prisms on the rear surface of the lens member, each prism having the apex thereof contiguous with the converging non-prism portion and the base thereof extending radially outwardly, the diopter power of the prisms adapted to refract an image within and along the peripheral edge of the central visually sensitive functional area of the retina, for expanding the normal central visual field of view of the eye without generating distortion, diplopia, or a blind spot between the normal central visual field of view and the extended visual field of view;
   wherein two of the three prisms are opposed and lie along a horizontal axis of the lens member for laterally expanding the central field of view, and wherein the third prism is interposed between the two prisms and extends vertically downward relative to the horizontal axis for downwardly expanding the normal central field of view;
   (c) a corrective lens surface on the lens member for focusing the deviated incoming light on a peripheral edge of the central sensitive area; and
   (d) a bifocal lens on the third prism.

* * * * *

UNITED STATES PATENT AND TRADEMARK OFFICE
CERTIFICATE OF CORRECTION

PATENT NO. : 5,155,508
DATED : October 13, 1992
INVENTOR(S) : Michael Onufryk

It is certified that error appears in the above-indentified patent and that said Letters Patent is hereby corrected as shown below:

Title page,
Item [60] should read as follows:

Continuation-in-part of Ser. No. 281,961, December 5, 1988, abandoned, which is a continuation of Ser. No. 44,837, April 30, 1987, abandoned, which is a division of Ser. No. 435,767, October 21, 1982, now Patent No. 4,673,263.

Signed and Sealed this

Twenty-second Day of October, 1996

Attest:

BRUCE LEHMAN

*Attesting Officer*     *Commissioner of Patents and Trademarks*